United States Patent
Lietz et al.

(10) Patent No.: US 9,313,281 B1
(45) Date of Patent: Apr. 12, 2016

(54) METHOD AND SYSTEM FOR CREATING AND DYNAMICALLY DEPLOYING RESOURCE SPECIFIC DISCOVERY AGENTS FOR DETERMINING THE STATE OF A CLOUD COMPUTING ENVIRONMENT

(71) Applicant: Intuit Inc., Mountain View, CA (US)

(72) Inventors: M. Shannon Lietz, San Marcos, CA (US); Eric Jason Hlutke, San Diego, CA (US); Javier Godinez, Bonita, CA (US); Luis Felipe Cabrera, Bellevue, WA (US)

(73) Assignee: Intuit Inc., Mountain View, CA (US)

( * ) Notice: Subject to any disclaimer, the term of this patent is extended or adjusted under 35 U.S.C. 154(b) by 321 days.

(21) Appl. No.: 14/079,425

(22) Filed: Nov. 13, 2013

(51) Int. Cl.
*G06F 15/16* (2006.01)
*H04L 29/08* (2006.01)

(52) U.S. Cl.
CPC ...................................... *H04L 67/16* (2013.01)

(58) Field of Classification Search
USPC ................................................. 709/202, 223
See application file for complete search history.

(56) References Cited

U.S. PATENT DOCUMENTS

| | | | |
|---|---|---|---|
| 5,731,991 A | 3/1998 | Kinra et al. | |
| 6,085,224 A | 7/2000 | Wagner | |
| 6,205,552 B1 | 3/2001 | Fudge | |
| 6,343,236 B1 | 1/2002 | Gibson et al. | |
| 6,549,932 B1 * | 4/2003 | McNally | G06F 9/4862 709/202 |
| 6,651,183 B1 | 11/2003 | Gensler et al. | |
| 7,114,183 B1 | 9/2006 | Joiner | |
| 7,296,261 B2 | 11/2007 | Witchel et al. | |
| 7,506,371 B1 | 3/2009 | Ben-Natan | |
| 7,552,424 B1 | 6/2009 | Bischof et al. | |
| 7,640,458 B2 | 12/2009 | Rao et al. | |
| 7,788,235 B1 | 8/2010 | Yeo | |
| 7,792,256 B1 | 9/2010 | Arledge et al. | |
| 7,944,355 B2 | 5/2011 | Kumar et al. | |
| 7,996,836 B1 | 8/2011 | McCorkendale et al. | |

(Continued)

FOREIGN PATENT DOCUMENTS

| | | |
|---|---|---|
| WO | WO 02/091182 | 11/2002 |
| WO | WO 2013/067404 | 5/2013 |
| WO | WO 2015/102776 | 7/2015 |

OTHER PUBLICATIONS

Lietz et al., "Method and System for Dynamic and Comprehensive Vulnerability Management," U.S. Appl. No. 14/052,971, filed Oct. 14, 2013.

(Continued)

*Primary Examiner* — Philip B Tran
(74) *Attorney, Agent, or Firm* — Hawley Troxell Ennis & Hawley LLP; Philip McKay

(57) ABSTRACT

Virtual resource specific discovery agents are instantiated in a first computing environment including internal resource specific data collection logic for directing and allowing the virtual resource specific discovery agents to collect data from a specific resource, or resource type, assigned to the virtual resource specific discovery agents. The virtual resource specific discovery agents then collect data from the specific resource, or resource type, assigned to the virtual resource specific discovery agents and provide the data collected from the specific resource, or resource types to a computing environment modeling system. The computing environment modeling system then transforms the data into description data for the computing environment indicating a state of the first computing environment at a given time.

28 Claims, 4 Drawing Sheets

(56) References Cited

U.S. PATENT DOCUMENTS

| | | | |
|---|---|---|---|
| 8,171,485 B2* | 5/2012 | Muller | G06F 9/5027 709/223 |
| 8,171,554 B2 | 5/2012 | Elovici et al. | |
| 8,181,036 B1 | 5/2012 | Nachenberg | |
| 8,510,821 B1 | 8/2013 | Brandwine et al. | |
| 8,555,388 B1 | 10/2013 | Wang et al. | |
| 8,561,126 B2 | 10/2013 | Ananthanarayanan et al. | |
| 8,561,127 B1 | 10/2013 | Agrawal et al. | |
| 8,615,785 B2 | 12/2013 | Elrod et al. | |
| 8,776,050 B2* | 7/2014 | Plouffe | G06F 9/45537 718/1 |
| 9,049,105 B1 | 6/2015 | Feinstein et al. | |
| 2002/0099992 A1 | 7/2002 | Distler et al. | |
| 2002/0116404 A1 | 8/2002 | Cha et al. | |
| 2003/0051154 A1 | 3/2003 | Barton et al. | |
| 2003/0084327 A1 | 5/2003 | Lingafelt et al. | |
| 2003/0195959 A1 | 10/2003 | Labadie et al. | |
| 2004/0237093 A1 | 11/2004 | Sluiman et al. | |
| 2005/0066309 A1 | 3/2005 | Creamer et al. | |
| 2005/0091304 A1 | 4/2005 | Trayler | |
| 2005/0172162 A1 | 8/2005 | Takahashi et al. | |
| 2005/0193269 A1 | 9/2005 | Haswell et al. | |
| 2005/0204151 A1 | 9/2005 | Fang et al. | |
| 2006/0101520 A1 | 5/2006 | Schumaker et al. | |
| 2006/0293940 A1 | 12/2006 | Tsyganskiy et al. | |
| 2007/0027999 A1 | 2/2007 | Allen et al. | |
| 2007/0079168 A1 | 4/2007 | Sivakumar et al. | |
| 2007/0094711 A1 | 4/2007 | Corley et al. | |
| 2007/0180509 A1 | 8/2007 | Swartz et al. | |
| 2007/0250424 A1 | 10/2007 | Kothari | |
| 2008/0016570 A1 | 1/2008 | Capalik | |
| 2008/0025288 A1 | 1/2008 | Benner et al. | |
| 2008/0044018 A1 | 2/2008 | Scrimsher et al. | |
| 2008/0262990 A1 | 10/2008 | Kapoor et al. | |
| 2008/0263670 A1 | 10/2008 | Stavrica | |
| 2008/0295076 A1 | 11/2008 | McKain et al. | |
| 2009/0007264 A1 | 1/2009 | Chatterjee et al. | |
| 2009/0089682 A1 | 4/2009 | Baier et al. | |
| 2009/0106838 A1 | 4/2009 | Clark et al. | |
| 2009/0199273 A1 | 8/2009 | Yalamanchi | |
| 2009/0254990 A1 | 10/2009 | McGee | |
| 2009/0288078 A1 | 11/2009 | Makonahalli et al. | |
| 2009/0300045 A1 | 12/2009 | Chaudhry et al. | |
| 2009/0300423 A1 | 12/2009 | Ferris | |
| 2009/0319527 A1 | 12/2009 | King et al. | |
| 2010/0077203 A1 | 3/2010 | Ogawa et al. | |
| 2010/0122317 A1 | 5/2010 | Yadav | |
| 2010/0251363 A1 | 9/2010 | Todorovic | |
| 2010/0269121 A1 | 10/2010 | Montesissa et al. | |
| 2010/0318481 A1 | 12/2010 | Feynman | |
| 2011/0034182 A1 | 2/2011 | Issa et al. | |
| 2011/0055921 A1 | 3/2011 | Narayanaswamy et al. | |
| 2011/0138382 A1* | 6/2011 | Hauser | G06F 9/4862 718/1 |
| 2011/0138469 A1 | 6/2011 | Ye et al. | |
| 2011/0145657 A1 | 6/2011 | Bishop et al. | |
| 2011/0154324 A1* | 6/2011 | Pagan | G06F 9/45558 718/1 |
| 2011/0208677 A1 | 8/2011 | Zhou et al. | |
| 2011/0238855 A1 | 9/2011 | Korsunsky et al. | |
| 2012/0039336 A1 | 2/2012 | Richmond et al. | |
| 2012/0072985 A1 | 3/2012 | Davne et al. | |
| 2012/0151488 A1 | 6/2012 | Arcese et al. | |
| 2012/0185390 A1 | 7/2012 | Palnitkar et al. | |
| 2012/0185913 A1 | 7/2012 | Martinez et al. | |
| 2012/0209947 A1 | 8/2012 | Glaser et al. | |
| 2012/0210437 A1 | 8/2012 | Karande et al. | |
| 2012/0233668 A1 | 9/2012 | Leafe et al. | |
| 2012/0303776 A1 | 11/2012 | Ferris | |
| 2012/0304300 A1 | 11/2012 | LaBumbard | |
| 2012/0311157 A1 | 12/2012 | Erickson et al. | |
| 2012/0324576 A1 | 12/2012 | Clark et al. | |
| 2013/0019242 A1 | 1/2013 | Chen et al. | |
| 2013/0046667 A1 | 2/2013 | Hill et al. | |
| 2013/0054792 A1 | 2/2013 | Sharaf | |
| 2013/0055398 A1 | 2/2013 | Li et al. | |
| 2013/0067067 A1 | 3/2013 | Miri et al. | |
| 2013/0091376 A1 | 4/2013 | Raspudic et al. | |
| 2013/0117809 A1 | 5/2013 | McDougal et al. | |
| 2013/0160072 A1 | 6/2013 | Reus et al. | |
| 2013/0247135 A1 | 9/2013 | Kundu et al. | |
| 2013/0291068 A1* | 10/2013 | Huang | G06F 9/5072 709/202 |
| 2013/0291087 A1 | 10/2013 | Kailash et al. | |
| 2013/0305357 A1 | 11/2013 | Ayyagari et al. | |
| 2013/0339514 A1 | 12/2013 | Crank et al. | |
| 2013/0347131 A1 | 12/2013 | Mooring et al. | |
| 2014/0013452 A1 | 1/2014 | Aissi et al. | |
| 2014/0026122 A1 | 1/2014 | Markande et al. | |
| 2014/0026179 A1 | 1/2014 | Devarajan et al. | |
| 2014/0068784 A1 | 3/2014 | Merkow et al. | |
| 2014/0082621 A1 | 3/2014 | Fitzgerald et al. | |
| 2014/0189680 A1* | 7/2014 | Kripalani | G06F 11/3664 717/176 |
| 2014/0258446 A1 | 9/2014 | Bursell | |
| 2014/0258715 A1 | 9/2014 | Rodniansky | |
| 2014/0282840 A1 | 9/2014 | Guinan | |
| 2014/0317737 A1 | 10/2014 | Shin et al. | |
| 2014/0344933 A1 | 11/2014 | Huh et al. | |
| 2015/0052108 A1 | 2/2015 | Volk et al. | |
| 2015/0052402 A1 | 2/2015 | Gurumurthy et al. | |

OTHER PUBLICATIONS

Lietz et al., "Method and System for Creating Enriched Log Data," U.S. Appl. No. 14/139,449, filed Dec. 23, 2013.

Cabrera et al., "Method and System for Intrusion and Extrusion Detection," U.S. Appl. No. 14/143,999, filed Dec. 30, 2013.

Cabrera et al., "Method and System for Extrusion and Intrusion Detection in a Cloud Computing Environment Using Network Communications Devices," U.S. Appl. No. 14/166,116, filed Jan. 28, 2014.

Cabrera et al., "Method and System for Extrusion and Intrusion Detection in a Cloud Computing Environment," U.S. Appl. No. 14/171,388, filed Feb. 3, 2014.

Lietz et al., "Method and System for Virtual Asset Assisted Extrusion and Intrusion Detection in a Cloud Computing Environment," U.S. Appl. No. 14/171,438, filed Feb. 3, 2014.

Bishop et al., "Method and System for Testing Cloud Based Applications in a Production Environment Using Fabricated User Data," U.S. Appl. No. 14/222,279, filed Mar. 21, 2014.

Weaver et al., "Method and System for Comparing Different Versions of a Cloud Based Application in a Production Environment Using Segregated Backend Systems," U.S. Appl. No. 14/231,141, filed Mar. 31, 2014.

Brinkley et al., "Method and System for Testing Cloud Based Applications and Services in a Production Environment Using Segregated Backend Systems," U.S. Appl. No. 14/231,253, filed Mar. 31, 2014.

Lietz et al., "Method and System for Providing Security Aware Applications," U.S. Appl. No. 14/247,131, filed Apr. 7, 2014.

Cabrera et al., Method and System for Providing Self-Monitoring, Self-Reporting, and Self-Repairing Virtual Assets in a Cloud Computing Environment, U.S. Appl. No. 14/256,289, filed Apr. 18, 2014.

Bishop et al., "Method and System for Ensuring an Application Conforms with Security and Regulatory Controls Prior to Deployment," U.S. Appl. No. 14/261,621, filed Apr. 25, 2014.

Lietz et al., "Method and System for Detecting Irregularities and Vulnerabilities in Dedicated Hosting Environments," U.S. Appl. No. 14/266,018, filed Apr. 30, 2014.

Lietz et al., "Method and System for Providing Reference Architecture Pattern-Based Permissions Management," U.S. Appl. No. 14/266,107, filed Apr. 30, 2014.

Cabrera et al., "Method and Apparatus for Automating the Building of Threat Models for the Public Cloud," U.S. Appl. No. 14/288,260, filed May 27, 2014.

Bonney et al., "Method and System for Implementing Data Security Policies Using Database Classification," U.S. Appl. No. 14/289,817, filed May 29, 2014.

(56) References Cited

OTHER PUBLICATIONS

Lietz et al., "Method and System for Secure Delivery of Information to Computing Environments," U.S. Appl. No. 14/319,286, filed Jun. 30, 2014.

Cabrera et al., "Method and System for Efficient Management of Security Threats in a Distributed Computing Environment," U.S. Appl. No. 14/319,352, filed Jun. 30, 2014.

Lietz et al., "Method and System for Providing a Virtual Asset Perimeter," U.S. Appl. No. 14/448,281, filed Jul. 31, 2014.

Cabrera et al., "Method and System for Providing Automated Self-Healing Virtual Assets," U.S. Appl. No. 14/448,326, filed Jul. 31, 2014.

\* cited by examiner

METHOD AND SYSTEM FOR CREATING AND DYNAMICALLY DEPLOYING RESOURCE SPECIFIC DISCOVERY AGENTS FOR DETERMINING THE STATE OF A CLOUD COMPUTING ENVIRONMENT

BACKGROUND

As various forms of distributed computing, such as cloud computing, have come to dominate the computing landscape, one long standing problem has been the inability to accurately determine, or in any meaningful way model, the state of the resources, both virtual and non-virtual, associated with a given cloud computing environment at a given time, i.e., to accurately determine the state of a given cloud computing environment at a given time.

This problem arises largely because a cloud computing environment typically includes virtual resources, such as server instances, data storage instances, and other virtual assets, and non-virtual resources, such as accounts, third party access systems, and various "bare metal" resources, each of which have different lifespans, operate in different computing environments and/or sub-environments, and perform their associated tasks using vastly differing operational parameters.

As an example, some resources, such as an account assigned to an enterprise, may be long lived, i.e., may exist for extended periods of time, while other resources, such as a virtual machine in operation, may be rather short lived, i.e., exist for only relatively short periods of time. Still other resources, like a virtual private cloud, a bastion host, or a load balancer, may have medium length lifespans. Consequently, simply determining when, or how often, to obtain data regarding the state of a cloud computing environment, and how long any collected data is valid, is not a trivial endeavor.

In addition, the various resources included in, or associated with, a given cloud computing environment vary so broadly, in both form and function, that using current methods to generate data gathering agents to interface with, and obtain data and operation metrics from, this vast array of different resource types would require an unacceptable amount of time, energy, and dedicated additional resources.

As a result of the situation discussed above, there is currently no efficient and effective mechanism for determining the precise state, or acceptable estimation of the state, or even the existence, of all the resources that are typically part of, or associated with, a given cloud computing environment. However, unfortunately, several management systems, services, applications, and billing systems operating in, or in association with, various cloud computing environments, need to obtain data indicating "a truth" that describes the state of the cloud computing environment in order to most efficiently and effectively perform their tasks.

What is needed is a method and system that leverages currently available cloud computing infrastructure to provide resource specific discovery agents to obtain state and/or metrics data from multiple types of resources in a cloud computing environment and that can then provide this data to a centralized computing environment modeling system that uses the collected data to generate a relatively accurate, and automatically updated, description of the first computing environment at a given time.

SUMMARY

In accordance with one embodiment, a method and system for creating and dynamically deploying resource specific discovery agents for determining the state of a computing environment includes generating one or more types of virtual resource specific discovery agent creation data through a virtual asset creation system. In one embodiment, each of the one or more types of virtual resource specific discovery agent creation data is used for instantiating one of one or more types of virtual resource specific discovery agents in a first computing environment. In one embodiment, the virtual resource specific discovery agent creation data for each type of virtual resource specific discovery agent includes security logic for providing authentication and trust for the virtual resource specific discovery agent and internal resource specific data collection logic for directing and allowing the virtual resource specific discovery agent to collect data from a specific resource, or resource type, assigned to the virtual resource specific discovery agent. In one embodiment, each type of virtual resource specific discovery agent is assigned a different specific resource, and/or resource type.

In one embodiment, the virtual resource specific discovery agents are instantiated and deployed in the first computing environment using the virtual resource specific discovery agent creation data. In one embodiment, each of the virtual resource specific discovery agents collects data from the specific resource, or resource type, assigned to the virtual resource specific discovery agents. In one embodiment, each of the virtual resource specific discovery agents then provides the data collected from the specific resource, or resource type, assigned to the virtual resource specific discovery agents to a computing environment modeling system.

In one embodiment, the computing environment modeling system then transforms the data collected by virtual resource specific discovery agents into description data for the computing environment indicating a state of the first computing environment at a given time.

In accordance with one embodiment, a method and system for creating and dynamically deploying resource specific discovery agents for determining the state of a computing environment includes generating one or more types of virtual resource specific discovery agent creation data through a virtual asset creation system. In one embodiment, each of the one or more types of virtual resource specific discovery agent creation data is used for instantiating one of one or more types of virtual resource specific discovery agents in a first computing environment. In one embodiment, the virtual resource specific discovery agent creation data for each type of virtual resource specific discovery agent includes security logic for providing authentication and trust for the virtual resource specific discovery agent and internal resource specific data collection logic for directing and allowing the virtual resource specific discovery agent to collect data from a specific resource, or resource type, assigned to the virtual resource specific discovery agent. In one embodiment, each type of virtual resource specific discovery agent is assigned a different specific resource, or resource type.

In one embodiment, one or more types of non-virtual resource specific discovery agents are generated. In one embodiment, each of the one or more types of non-virtual resource specific discovery agents include internal resource specific data collection logic for directing and allowing each non-virtual resource specific discovery agent to collect data from a specific resource, or resource type, assigned to the non-virtual resource specific discovery agent.

In one embodiment, the virtual resource specific discovery agents are instantiated and deployed in the first computing environment using the virtual resource specific discovery agent creation data.

In one embodiment, the non-virtual resource specific discovery agents are deployed in one or more computing environments.

In one embodiment, each of the virtual resource specific discovery agents collects data from the specific resource, or resource type, assigned to the virtual resource specific discovery agents and then each of the virtual resource specific discovery agents provides the data collected from the specific resource, or resource type, assigned to the virtual resource specific discovery agents to a computing environment modeling system.

In one embodiment, each of the non-virtual resource specific discovery agents collects data from the specific resource, or resource type, assigned to the non-virtual resource specific discovery agents and then each of the non-virtual resource specific discovery agents provides the data collected from the specific resource, or resource type, assigned to the non-virtual resource specific discovery agents to the computing environment modeling system.

In one embodiment, the computing environment modeling system then transforms the data collected by virtual resource specific discovery agents and the non-virtual resource specific discovery agents into description data for the computing environment indicating a state of the first computing environment at a given time.

Figure 1:
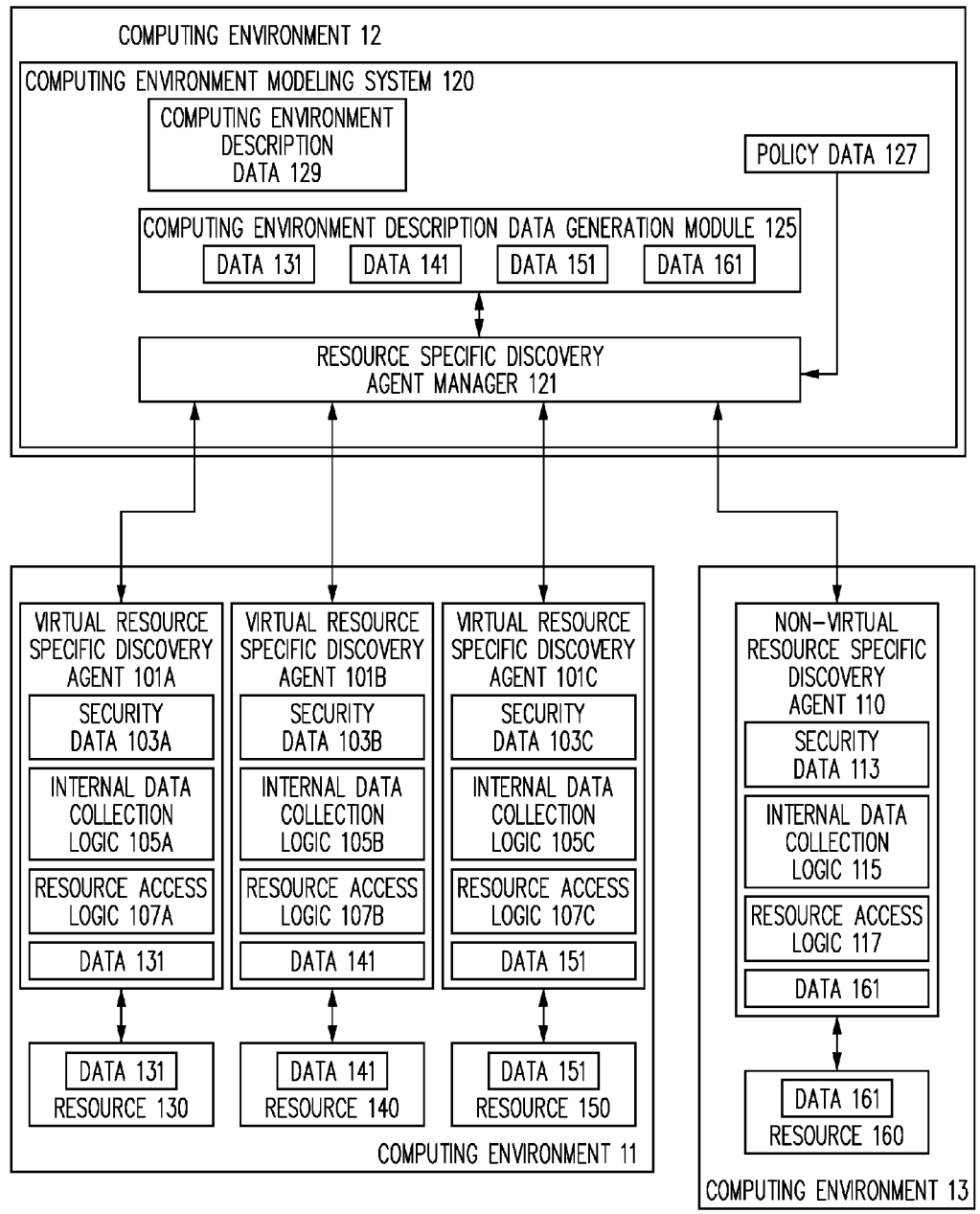
FIG. 1 is a functional block diagram showing the interaction of various elements for implementing one embodiment of a process for creating and dynamically deploying resource specific discovery agents for determining the state of a computing environment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for creating and dynamically deploying resource specific discovery agents for determining the state of a computing environment includes a process for creating and dynamically deploying resource specific discovery agents for determining the state of a computing environment implemented, at least in part, by one or more computing systems.

As used herein, the term "computing system", includes, but is not limited to, a server computing system; a workstation; a desktop computing system; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the term computing system, can denote, but is not limited to, systems made up of multiple server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In various embodiments, the one or more computing systems implementing the process for creating and dynamically deploying resource specific discovery agents for determining the state of a computing environment are logically or physically located, and/or associated with, one or more computing environments. As used herein, the term "computing environment" includes, but is not limited to, a logical or physical grouping of connected or networked computing systems using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments, are those where the components, infrastructure, communication and networking systems, and security systems associated with the computing systems making up the trusted computing environment, are either under the control of, or known to, a party. In contrast, unknown, or untrusted computing environments are environments and systems where the components, infrastructure, communication and networking systems, and security systems implemented and associated with the computing systems making up the untrusted computing environment, are not under the control of, and/or are not known by, a party, and/or are dynamically configured with new elements capable of being added that are unknown to the party.

Examples of trusted computing environments include the components making up data centers associated with, and/or controlled by, a party, and/or any computing systems, and/or networks of computing systems, associated with, known by, and/or controlled by, a party. Examples of untrusted computing environments include, but are not limited to, public networks, such as the Internet, various cloud computing environments, and various other forms of distributed computing systems.

It is often the case that a party desires to transfer data to, and from, a first computing environment that is an untrusted computing environment, such as, but not limited to, a public cloud, a virtual private cloud, and a trusted computing environment, such as, but not limited to, networks of computing systems in a data center controlled by, and/or associated with, the party. However, in other situations, a party may wish to transfer data between two trusted computing environments, and/or two untrusted computing environments.

In one embodiment, one or more computing systems, and/or one or more computing environments, are connected by one or more communications systems, and/or distributed computing system networks, such as, but not limited to: a public cloud; a private cloud; a virtual private cloud (VPN); a subnet; any general network, communications network, or general network/communications network system; a combination of different network types; a public network; a private network; a satellite network; a cable network; or any other network capable of allowing communication between one or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between one or more computing systems, whether available or known at the time of filing or as later developed.

FIG. 1 is a functional diagram of the interaction of various elements associated with one embodiment of the method and system for creating and dynamically deploying resource specific discovery agents for determining the state of a computing environment discussed herein. Of particular note, the various elements in FIG. 1 are shown for illustrative purposes as being associated with specific computing environments, such as computing environment 11, computing environment 12, and computing environment 13. However, the exemplary placement of the various elements within these environments and systems in FIG. 1 is made for illustrative purposes only and, in various embodiments, any individual element shown in FIG. 1, or combination of elements shown in FIG. 1, can be implemented and/or deployed on any of one or more computing environments or systems, and/or architectural or infrastructure components, such as one or more hardware systems, one or more software systems, one or more data centers, one or more clouds or cloud types, one or more third party service capabilities, or any other computing environments, architectural, and/or infrastructure components, as discussed herein, and/or as known in the art at the time of filing, and/or as developed/made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, the owner of a data center keeping or accessing the secrets data, a party, and/or entity providing all, or a portion, of a cloud-based computing environment, the owner or a provider of a service, the owner or provider of one or more resources accessible using the secrets, and/or any other party, and/or entity providing one or more functions, and/or any other party, and/or entity, as discussed herein, and/or as known in the art at the time of filing, and/or as made known after the time of filing.

In accordance with one embodiment, virtual resource specific discovery agents are provided in a first computing environment.

In one embodiment, the virtual resource specific discovery agents are virtual assets instantiated in the first computing environment. In one embodiment, the virtual resource specific discovery agents are virtual assets instantiated in a cloud computing environment.

As used herein, the term "virtual asset" includes any virtualized entity or resource, and/or a software subsystem of an actual, or "bare metal" entity. In various embodiments, virtual assets can be, but are not limited to, virtual machines, virtual servers, and instances implemented in a cloud computing environment; administrative and/or data store instances implemented, or associated with, a cloud computing environment; services related instances associated with, and or delivered through, a cloud computing environment; and/or any other virtualized assets and/or sub-systems of "hard metal" physical devices, as discussed herein, and/or as known/available in the art at the time of filing, and/or as developed/made available after the time of filing.

In one embodiment, the virtual resource specific discovery agents are instantiated in the first computing environment using a virtual asset creation system such as a virtual asset creation template through which the creator of the virtual resource specific discovery agent can generate virtual resource specific discovery agent creation data such as, but not limited to, internal resource specific data collection logic, such as data assigning the virtual resource specific discovery agent a specific resource, or resource type, and operational logic for directing, and/or allowing, the virtual resource specific discovery agents to perform specific state and/or metric data collection functions assigned to the virtual resource specific discovery agents; and resource access logic assigning access permissions data to the virtual resource specific discovery agents necessary to perform the data collection functions assigned to the virtual resource specific discovery agents.

In one embodiment, by virtue of the customization of the virtual asset templates to instantiate the virtual resource specific discovery agents, the virtual asset templates are transformed into specialized virtual asset templates herein referred to as virtual resource specific discovery agent creation templates.

In various embodiments, the virtual resource specific discovery agent creation templates include security logic for providing security and trust in the virtual resource specific discovery agents to be instantiated using the virtual resource specific discovery agent creation templates, and for identifying the virtual resource specific discovery agents as trusted agents generated within the first computing environment.

In one embodiment, the virtual resource specific discovery agent security logic includes one or challenges, and/or responses to challenges, that are used to authenticate the virtual resource specific discovery agent and to further identify the virtual resource specific discovery agent as a trusted agent. In one embodiment, the virtual resource specific discovery agent security logic is used by, or provided to, other entities/resources as part of the bootstrap handshake with those entities/resources at the time a virtual resource specific discovery agent is first instantiated in the first computing environment.

As discussed below, in one embodiment, the virtual resource specific discovery agent security logic is provided to a resource specific discovery agent manager that is part of a centralized computing environment modeling system in a second computing environment in order to authenticate the virtual resource specific discovery agent and identify the virtual resource specific discovery agent as a trusted virtual asset in the first computing environment. In one embodiment, the virtual resource specific discovery agent security logic is provided in addition to standard authentication procedures performed with an initial set of credentials.

As noted above, in various embodiments, through the virtual resource specific discovery agent creation templates, each of the virtual resource specific discovery agents to be instantiated using the virtual resource specific discovery agent creation templates are provided internal resource specific data collection logic, such as data assigning the virtual resource specific discovery agent a specific resource, or resource type, and operational logic for directing, and/or allowing, the virtual resource specific discovery agents to perform specific state and/or metrics data gathering functions assigned to the virtual resource specific discovery agents. As also noted above, resource access logic is provided to each of the virtual resource specific discovery agents, as separate logic, and/or as part of the internal resource specific data collection logic provided to the virtual resource specific discovery agents.

In various embodiments, the resource access logic provides access permissions data to the virtual resource specific discovery agents necessary to collect the assigned state and/or metrics data, from the specific resource, or resource type, assigned to the virtual resource specific discovery agents.

In various embodiments, the internal resource specific data collection logic and/or the resource access logic provided to a given virtual resource specific discovery agent depends on the specific state and/or metrics data collection function assigned to the virtual resource specific discovery agent and the type of resource assigned to the virtual resource specific discovery agent. For example, a virtual resource specific discovery agent may be provided with internal resource specific data collection logic including instructions for gathering data from a specific type of resource, such as a specific type of virtual server instance, or a specific virtual server instance, and resource access logic including the credentials and access rights data required to access the state and/or metrics data from the specific type of virtual asset, and/or a specific virtual asset.

As discussed above, in various embodiments, different types, or classes, of virtual resource specific discovery agents are instantiated using different types of virtual resource specific discovery agent creation data and resource access logic provided through the virtual resource specific discovery agent creation templates. As also noted above, different types, or classes, of virtual resource specific discovery agents are directed to data collection for specific assigned resources, or types of assigned resources.

Herein, the specific resources, or specific resource types, assigned to a virtual resource specific discovery agent can include, but are not limited to, a virtual machine instance; a virtual server instance; a virtual data store instance; a database or data store; any instance in a cloud computing environment; a cloud computing environment access system; part of a mobile device; part of a remote sensor; part of a laptop computing system; part of a desktop computing system; part of a point-of-sale computing system; and part of an ATM; a server computing system; a workstation; a storage cluster; a switching system; a router; any hardware system; any communications system; any form of proxy system; a gateway system; a firewall system; a load balancing system; a bastion host; an application; an account; an external accessibility monitoring service; an enterprise; a service; or any other virtual or non-virtual asset as discussed herein, and/or as known in the art at the time of filing, and/or as becomes known after the time of filing.

In some embodiments, the virtual resource specific discovery agent is provided with data collection interval logic. In various embodiments, the data collection interval logic indicates a time interval between automatic deployments of the virtual resource specific discovery agent. In some embodiments, the data collection interval logic is implemented in a resource specific discovery agent manager that is part of a centralized computing environment modeling system in a second computing environment.

In various embodiments, the time interval between automatic deployments of the virtual resource specific discovery agent is determined based, at least in part, on the resource assigned to the virtual resource specific discovery agent. In various embodiments, the time interval between automatic deployments of the virtual resource specific discovery agent is shorter if the virtual resource specific discovery agent is assigned a resource with a relatively short lifespan, such as virtual machine and server instances, or of a higher value such as a large database. In various embodiments, the time interval between automatic deployments of the virtual resource specific discovery agent is longer for less valuable resources and/or resources of a more permanent nature, such as long-term/high latency storage and accounts. In various embodiments, the interval between automatic deployments of the virtual resource specific discovery agent is relatively infrequent if the resource assigned to the virtual resource specific discovery agent is a medium lived resource such as a load balancer or bastion host.

Consequently, by providing different internal resource specific data collection logic, different resource access logic, and different data collection interval logic, in one embodiment, through the virtual resource specific discovery agent creation templates, the creator of a virtual resource specific discovery agent can easily and efficiently instantiate highly specialized virtual resource specific discovery agents to collect specific types of state and/or metrics data, from specific types of resources, and at specified intervals of time, and, as discussed below, then remove, retire, or delete the virtual resource specific discovery agents from the first computing environment when the specific data collection functions assigned to the virtual resource specific discovery agents are completed. This provides for an extremely flexible, dynamic, and secure method for obtaining state and/or metrics data from a large array of different types of resources in various computing environments.

In various embodiments, by simply changing the internal resource specific data collection logic and/or resource access logic provided to a virtual resource specific discovery agent through a virtual resource specific discovery agent creation template, the creator of the virtual resource specific discovery agents can create one, or multiple copies of, multiple different types of virtual resource specific discovery agents for collecting specified state and/or metrics data from specified resources, such as any of the resources discussed herein, and/or as known in the art at the time of filing, and/or as developed/made available after the time of filing.

In some embodiments, the different types of virtual resource specific discovery agents are created in advance of an identified need for the specific state data, and/or metric data, collection task, assigned to virtual resource specific discovery agents. In these embodiments, one or more virtual resource specific discovery agents, or templates for creating the different types of virtual resource specific discovery agents, are then stored to await an identified need for the specific state and/or metric data collection function, and/or specific type of resource, assigned to the virtual resource specific discovery agents. In these embodiments, the virtual resource specific discovery agents are then instantiated and/or deployed, in one embodiment by a resource specific discovery agent manager, when the specific type of resource assigned to the virtual resource specific discovery agent is added, and/or when data from the specific type of resource is needed, and/or in accordance with the data collection interval logic.

In other embodiments, the virtual resource specific discovery agents are instantiated only once the specific type of resource assigned to the virtual resource specific discovery agent is added, and/or when data from the specific type of resource is needed, and/or in accordance with the data collection interval logic. In these embodiments, once the need for a specific virtual resource specific discovery agent is identified, the appropriate internal resource specific data collection logic is provided via virtual resource specific discovery agent creation data generated through a virtual resource specific discovery agent creation template. The virtual resource specific discovery agent is then instantiated, in one embodiment, through a resource specific discovery agent manager and/or in accordance with the data collection interval logic.

As noted above, in various embodiments, a resource specific discovery agent manager is used to instantiate, and/or deploy, the virtual resource specific discovery agents. In one embodiment, the resource specific discovery agent manager instantiates, and/or deploys, the virtual resource specific discovery agents in accordance with one or more state and/or metric data collection policies, referred to herein as resource specific discovery agent deployment policies, and/or policy data.

In various embodiments, the virtual resource specific discovery agent deployment policy data is open-endedly defined such that the virtual resource specific discovery agent deployment policy can be defined by the one or more parties such as, but not limited to, the owner of a data center, the owner or provider of a cloud computing environment, the owner or a provider of a service, the owner or provider of one or more resources, and/or any other party. In this way, using the disclosed process for providing a resource specific discovery agent, the virtual resource specific discovery agent deployment policy can be tailored to the specific needs of the one or more parties, and/or one or more resources. In addition, resource specific discovery agent deployment policies can be added, modified, or deleted, as needed to meet the needs of the one or more parties.

In one embodiment, once instantiated, the one or more virtual resource specific discovery agents are deployed in the first computing environment to obtain/collect data from the various resources specifically assigned to each type of virtual resource specific discovery agent.

In various embodiments, the virtual resource specific discovery agents are directed to the specific resources, or resource types, assigned to the virtual resource specific discovery agents and then, using the provided resource access logic, the virtual resource specific discovery agents obtain access to the specific resources, or resource types, assigned to the virtual resource specific agents. In one embodiment, once access is obtained, the virtual resource specific discovery agents collect state and/or metrics data in accordance with the internal resource specific data collection logic provided to the virtual resource specific discovery agents through the virtual resource specific discovery agent creation templates.

In various embodiments, the data collected by the virtual resource specific discovery agents includes, but is not limited to, state data associated with the specifically assigned resource for the virtual resource specific discovery agents and/or various metrics data associated with the specifically assigned resource.

As one specific illustrative example, the data collected by a given virtual resource specific discovery agent pertains to the accounts in the first computing environment, and the characteristics of the customer that holds that account. These characteristics may come from a diversity of resources, including the enterprise user system, the enterprise accounting system where the budgets that pertain to the customer can be obtained, and the enterprise authorization system that determines which resources in the cloud this customer may obtain.

As another specific illustrative example, the data collected by a given virtual resource specific discovery agent pertains to access controls and authorization data from the first computing environment and this data is then stored in the representation of the user.

As another specific illustrative example, the compute, network, and storage aspects of the provider of the first computing environment for the different accounts is collected and this data is stored in a repository that describes the customers, their accounts, and the resources for, or associated with, the accounts.

In various embodiments, any type of data and/or metrics can be collected by a given virtual resource specific discovery agent depending on the internal resource specific data collection logic provided to that given virtual resource specific discovery agent.

In one embodiment, once the virtual resource specific discovery agents have collected the assigned data from the specific resources, or resource types, assigned to the virtual resource specific discovery agents, the collected data is then provided to a computing environment modeling system. In one embodiment, the computing environment modeling system is implemented in a second computing environment and includes a computing environment description data generation module which transforms the data collected by the virtual resource specific discovery agents into computing environment description data.

In one embodiment, the computing environment description data indicates a state of the first computing environment at a given time, and/or a representation of specific metrics associated with the first computing environment at a given time.

In various embodiments, the computing environment description data is updated whenever new data is received from one or more virtual resource specific discovery agents, in one embodiment, automatically.

In some embodiments, once a determination is made that a given virtual resource specific discovery agent has performed the specific state and/or metric data collection function assigned to that given virtual resource specific discovery agent, the given virtual resource specific discovery agent is recalled and stored for reuse on a periodic basis, and/or when the need for the specific function assigned to the given virtual resource specific discovery agent is identified. In other embodiments, once a determination is made that a given virtual resource specific discovery agent has performed the specific state and/or metric data collection function assigned to that given virtual resource specific discovery agent, the given virtual resource specific discovery agent is destroyed or deleted.

Using the virtual resource specific discovery agents described herein, currently available cloud computing infrastructure is leveraged to provide a flexible and dynamic ability to obtain state and/or metrics data from multiple types of resources in a computing environment, such as a cloud computing environment, and then generate a relatively accurate description of the computing environment at a given time.

In accordance with one embodiment, virtual resource specific discovery agents are provided in a first computing environment as discussed above.

In one embodiment, the virtual resource specific discovery agents are virtual assets instantiated in the first computing environment. In one embodiment, the virtual resource specific discovery agents are virtual assets instantiated in a cloud computing environment.

In one embodiment, one or more non-virtual resource specific discovery agents are also generated.

In various embodiments, the non-virtual resource specific discovery agents include security logic for providing security and trust in the non-virtual resource specific discovery agents and for identifying the non-virtual resource specific discovery agents as trusted agents.

In one embodiment, the non-virtual resource specific discovery agents are provided internal resource specific data collection logic, such as data assigning the virtual resource specific discovery agent a specific resource, or resource type, and operational logic for directing, and/or allowing, the non-virtual resource specific discovery agents to perform specific state and/or metrics data gathering functions assigned to the non-virtual resource specific discovery agents.

In addition, in one embodiment, the non-virtual resource specific discovery agents are provided resource access logic as separate logic, and/or as part of the internal resource specific data collection logic. In various embodiments, the resource access logic provides access permissions data to the non-virtual resource specific discovery agents necessary to collect the assigned state and/or metrics data, from the specific resource, or resource type, assigned to the non-virtual resource specific discovery agents.

In various embodiments, the internal resource specific data collection logic and/or the resource access logic provided to a given non-virtual resource specific discovery agent depends on the specific state and/or metrics data collection function assigned to the non-virtual resource specific discovery agent and the type of resource assigned to the non-virtual resource specific discovery agent.

For example, a non-virtual resource specific discovery agent may be provided with internal resource specific data collection logic including instructions for gathering data from a specific type of resource, such as an external accessibility monitoring service charged with checking, or pinging, various parts of a computing environment to determine the accessibility of the computing environment, and resource access logic including the credentials and access rights data required to access the data in the external accessibility monitoring service.

In various embodiments, different types, or classes, of non-virtual resource specific discovery agents are generated using different types of resource access logic and different types, or classes, of non-virtual resource specific discovery agents are directed to data collection for specific assigned resources, or types of assigned resources.

Herein, the specific resources, or specific resource types, assigned to a non-virtual resource specific discovery agent can include, but are not limited to a database or data store; a computing environment access system; an external accessibility/operational monitoring service; a mobile device; a remote sensor; a laptop computing system; a desktop computing system; a point-of-sale computing system; an ATM; a server computing system; a workstation; a storage cluster; a switching system; a router; any hardware system; any communications system; any form of proxy system; a gateway system; a firewall system; a load balancing system; a bastion host; an application; an account; an enterprise; a service; or any other asset as discussed herein, and/or as known in the art at the time of filing, and/or as becomes known after the time of filing.

In some embodiments, the non-virtual resource specific discovery agent is provided with data collection interval logic. In various embodiments, the data collection interval logic indicates a time interval between automatic deployments of the non-virtual resource specific discovery agent. In some embodiments, the data collection interval logic is implemented in a resource specific discovery agent manager that is part of a centralized computing environment modeling system in a second computing environment.

In various embodiments, the time interval between automatic deployments of the non-virtual resource specific discovery agent is determined based, at least in part, on the resource assigned to the non-virtual resource specific discovery agent. In various embodiments, the time interval between automatic deployments of the non-virtual resource specific discovery agent is shorter if the non-virtual resource specific discovery agent is assigned a resource with a relatively short lifespan or of a higher value such as a large database. In various embodiments, the time interval between automatic deployments of the non-virtual resource specific discovery agent is longer for less valuable resources and/or resources of a more permanent nature, such as long-term/high latency storage and accounts. In various embodiments, the interval between automatic deployments of the non-virtual resource specific discovery agent is relatively infrequent if the resource assigned to the non-virtual resource specific discovery agent is a medium lived resource such as a load balancer or bastion host.

Consequently, by providing different internal resource specific data collection logic, different resource access logic, and different data collection interval logic, the creator of a non-virtual resource specific discovery agent can easily and efficiently generate highly specialized non-virtual resource specific discovery agents to collect specific types of state and/or metrics data, from specific types of resources, and at specified intervals of time. This provides for an extremely flexible, dynamic, and secure method for obtaining state and/or metrics data from a large array of different types of resources in various computing environments.

As noted above, in various embodiments, a resource specific discovery agent manager is used to deploy the virtual and non-virtual resource specific discovery agents. In one embodiment, the resource specific discovery agent manager instantiates, and/or deploys, the virtual and non-virtual resource specific discovery agents in accordance with one or more state and/or metric data collection policies, referred to herein as resource specific discovery agent deployment policies, and/or policy data.

In various embodiments, the resource specific discovery agent deployment policy data is open-endedly defined such that the resource specific discovery agent deployment policy can be defined by the one or more parties such as, but not limited to, the owner of a data center, the owner or provider of a cloud computing environment, the owner or a provider of a service, the owner or provider of one or more resources, and/or any other party. In this way, using the disclosed process for providing a resource specific discovery agent, the resource specific discovery agent deployment policy can be tailored to the specific needs of the one or more parties, and/or one or more resources. In addition, resource specific discovery agent deployment policies can be added, modified, or deleted, as needed to meet the needs of the one or more parties.

In one embodiment, once instantiated and/or generated, the one or more virtual resource specific discovery agents are deployed in the first computing environment, and the one or more non-virtual resource specific discovery agents are deployed in one or more computing environments, to obtain/ collect data from the various resources specifically assigned to each type of virtual and non-virtual resource specific discovery agent.

In various embodiments, the virtual and non-virtual resource specific discovery agents are directed to the specific resources, or resource types, assigned to the virtual and non-virtual resource specific discovery agents and then, using the provided resource access logic, the virtual and non-virtual resource specific discovery agents obtain access to the specific resources, or resource types, assigned to the virtual and non-virtual resource specific agents. In one embodiment, once access is obtained, the virtual and non-virtual resource specific discovery agents collect state and/or metrics data in accordance with the internal resource specific data collection logic provided to the virtual and non-virtual resource specific discovery agents.

In various embodiments, the data collected by the virtual and non-virtual resource specific discovery agents includes, but is not limited to, state data associated with the specifically assigned resource for the virtual and non-virtual resource specific discovery agents and/or various metrics data associated with the specifically assigned resource.

In various embodiments, any type of data and/or metrics can be collected by a given virtual and/or non-virtual resource specific discovery agent depending on the internal resource specific data collection logic provided to that given virtual and/or non-virtual resource specific discovery agent.

In one embodiment, once the virtual and non-virtual resource specific discovery agents have collected the assigned data from the specific resources, or resource types, assigned to the virtual and non-virtual resource specific discovery agents, the collected data is then provided to a computing environment modeling system. In one embodiment, the computing environment modeling system is implemented in a second computing environment and includes a computing environment description data generation module which transforms the data collected by the virtual and non-virtual resource specific discovery agents into computing environment description data.

In one embodiment, the computing environment description data indicates a state of the first computing environment at a given time, and/or a representation of specific metrics associated with the first computing environment at a given time.

In various embodiments, the computing environment description data is updated whenever new data is received from one or more virtual and non-virtual resource specific discovery agents, in one embodiment, automatically.

Using the virtual and non-virtual resource specific discovery agents described herein, currently available cloud computing infrastructure is leveraged to provide a flexible and dynamic ability to obtain state and/or metrics data from multiple types of resources in a computing environment, such as a cloud computing environment, and then generate a relatively accurate description of the computing environment at a given time.

Referring to FIG. 1, virtual resource specific discovery agents 101A, 101B, and 101C are shown as instantiated and deployed in computing environment 11. As discussed above, in various embodiments, each of the virtual resource specific discovery agents 101A, 101B, and 101C is a different type of virtual resource specific discovery agent instantiated for performing a different specific data collection function with respect to a specific resource assigned to a given one of virtual resource specific discovery agents 101A, 101B, and 101C. In other embodiments, virtual resource specific discovery agents 101A, 101B, and 101C can all be the same type of virtual resource specific discovery agent, or any one or more of virtual resource specific discovery agents 101A, 101B, and 101C can be of the same type of virtual resource specific discovery agent.

In the illustrative example of FIG. 1, only three virtual resource specific discovery agents, i.e., virtual resource specific discovery agents 101A, 101B, and 101C are shown for simplicity. However, in various embodiments any number of virtual resource specific discovery agents can be deployed of any number of different types.

As seen in FIG. 1, and as noted above, in this specific illustrative example, virtual resource specific discovery agents 101A, 101B, and 101C are instantiated in computing environment 11, such as, in one embodiment, a cloud computing environment.

As also seen in FIG. 1, in one embodiment virtual resource specific discovery agents 101A, 101B, and 101C are controlled or managed by resource specific discovery agent manager 121 of computing environment modeling system 120 implemented, in this specific illustrative example, in computing environment 12. As seen in FIG. 1, policy data 127 is provided to resource specific discovery agent manager 121 as input data that, in one embodiment, determines which resource specific discovery agents are deployed to which resources and at what time.

As also seen in FIG. 1, each of the virtual resource specific discovery agents 101A, 101B, and 101C includes security data 103A, 103B, and 103C, respectively, for identifying each of the virtual resource specific discovery agents 101A, 101B, and 101C, and/or establishing access rights associated with each of the virtual resource specific discovery agents 101A, 101B, and 101C.

As also seen in FIG. 1, each of the virtual resource specific discovery agents 101A, 101B, and 101C includes internal resource specific data collection logic 105A, 105B, and 105C which includes logic for directing and/or allowing each of the virtual resource specific discovery agents 101A, 101B, and 101C to perform the data collection functions assigned to virtual resource specific discovery agents 101A, 101B, and 101C.

In addition, each of the virtual resource specific discovery agents 101A, 101B, and 101C includes resource access logic 107A, 107B, and 107C, representing resources and attributes assigned to virtual resource specific discovery agents 101A, 101B, and 101C necessary to perform the specific data collection functions assigned to the virtual resource specific discovery agents 101A, 101B, and 101C via internal resource specific data collection logic 105A, 105B, and 105C.

As also noted above, each of the virtual resource specific discovery agents is instantiated using a virtual asset creation system such as a specialized virtual asset template, herein referred to as a virtual resource specific discovery agent creation template.

Figure 2:
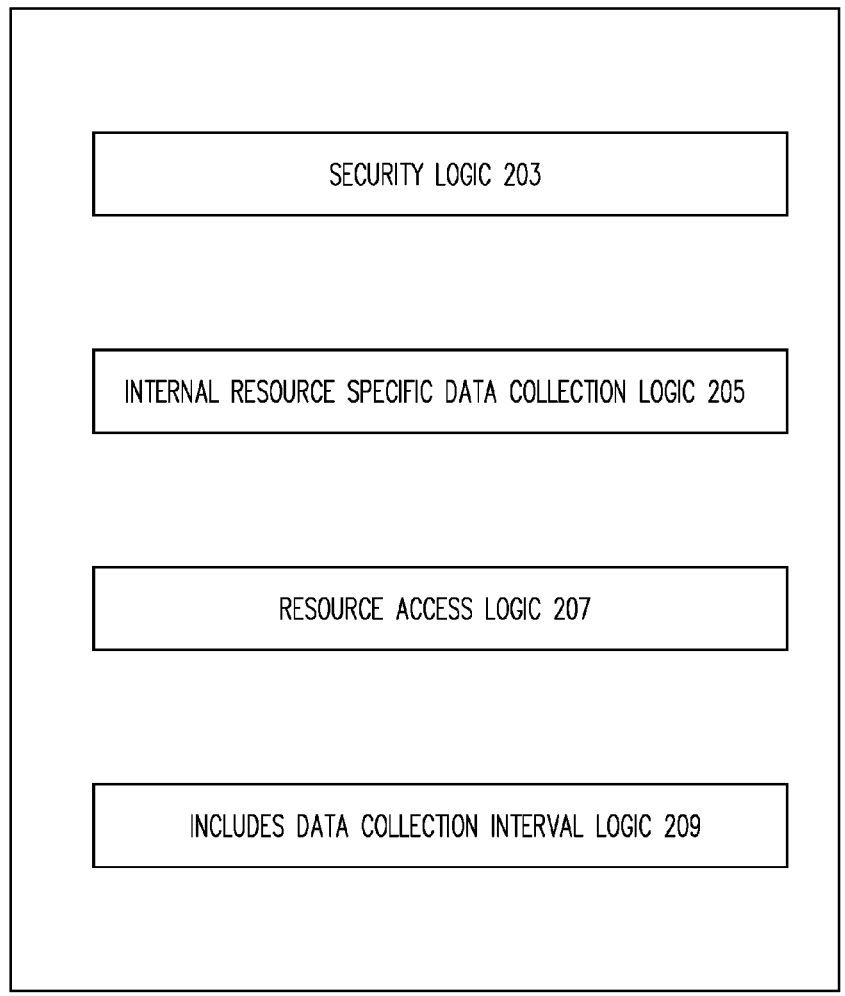
FIG. 2 is a functional diagram of a virtual resource specific discovery agent creation template in accordance with one embodiment.

FIG. 2 is a functional diagram of part of the operational logic of a virtual resource specific discovery agent creation template 200 for creating a virtual resource specific discovery agent, such as any of the virtual resource specific discovery agents 101A, 101B, and 101C of FIG. 1, in accordance with one embodiment.

As seen in FIG. 2, in one embodiment, virtual resource specific discovery agent creation template 200 includes security logic 203 to, as discussed above, identify the virtual resource specific discovery agents as trusted agents deployed within the first computing environment.

As seen in FIG. 2, in one embodiment, virtual resource specific discovery agent creation template 200 includes internal resource specific data collection logic 205, such as operational logic for, as discussed above, directing, and/or allowing, the virtual resource specific discovery agents to perform specific data collection functions with the specific resources assigned to the virtual resource specific discovery agents and assigning the specific resources, or resources types, to the virtual resource specific discovery agents.

As seen in FIG. 2, in one embodiment, virtual resource specific discovery agent creation template 200 includes resource access logic 207 assigning access permissions data necessary to perform the specific data collection functions assigned to the virtual resource specific discovery agents via internal resource specific data collection logic 205.

As seen in FIG. 2, in one embodiment, virtual resource specific discovery agent creation template 200 includes data collection interval logic 209 that, as discussed above, indicates a time interval between automatic deployments of the virtual resource specific discovery agent, in one embodiment, based on the type of resource assigned to the virtual resource specific discovery agent.

Referring back to FIG. 1, also shown is non-virtual resource specific discovery agent 110. As seen in FIG. 1, non-virtual resource specific discovery agent 110 includes security data 113, internal resource specific data collection logic 115, and resource access data 117. As seen in FIG. 1, in this specific illustrative example, non-virtual resource specific discovery agent 110 is deployed in computing environment 13.

In the illustrative example of FIG. 1, only none non-virtual resource specific discovery agent, i.e., non-virtual resource specific discovery agent 110, is shown for simplicity. However, in various embodiments any number of non-virtual resource specific discovery agents can be deployed of any number of different types.

Returning to FIG. 1, as noted above, each of the virtual resource specific discovery agents 101A, 101B, and 101C includes internal resource specific data collection logic 105A, 105B, and 105C, and non-virtual resource specific discovery agent 110 includes internal resource specific data collection logic 115, which includes logic for directing and/or allowing each of the virtual resource specific discovery agents 101A, 101B, and 101C and non-virtual resource specific discovery agent 110 to perform the data collection functions assigned to virtual resource specific discovery agents 101A, 101B, and 101C and non-virtual resource specific discovery agent 110.

As seen in FIG. 1, each of the virtual resource specific discovery agents 101A, 101B, and 101C and non-virtual resource specific discovery agent 110 uses its respective resource access logic 107A, 107B, and 107C and 117 to access its assigned resource, shown as resources 130, 140, 150, and 160 in FIG. 1. In various embodiments, resources 130, 140, 150, and 160 can be, but are not limited to, any of the resources as discussed herein, and/or as known in the art at the time of filing, and/or as developed after the time of filing. As seen in FIG. 1, each of the virtual resource specific discovery agents 101A, 101B, and 101C and non-virtual resource specific discovery agent 110 then collects data from its respective assigned resource, shown as data 131 of resource 130, data 141 of resource 140, data 151 of resource 150, and data 161 of resource 160 in accordance with their respective internal resource specific data collection logic 105A through 105C and 115.

In one embodiment, once each of the virtual resource specific discovery agents 101A, 101B, and 101C and non-virtual resource specific discovery agent 110 has collected its respective data 131, data 141, data 151, and data 161 in computing environments 11 and 13, this data is transferred back to computing environment description data generation module 125 of computing environment modeling system 120 in computing environment 12. As also seen in FIG. 1, computing environment description data generation module 125 then processes data 131, data 141, data 151, and data 161 to generate computing environment description data 129 which, in one embodiment, represents data describing the state of the first computing environment, i.e., in this specific illustrative example, computing environment 11, at a given time.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, process for creating and dynamically deploying virtual resource specific discovery agents for determining the state of a computing environment includes generating one or more types of virtual resource specific discovery agent creation data through a virtual asset creation system. In one embodiment, each of the one or more types of virtual resource specific discovery agent creation data is used for instantiating one of one or more types of virtual resource specific discovery agents in a first computing environment. In one embodiment, the virtual resource specific discovery agent creation data for each type of virtual resource specific discovery agent includes security logic for providing authentication and trust for the virtual resource specific discovery agent and internal resource specific data collection logic for directing and allowing the virtual resource specific discovery agent to collect data from a specific resource, or resource type, assigned to the virtual resource specific discovery agent. In one embodiment, each type of virtual resource specific discovery agent is assigned a different specific resource, and/or resource type.

In one embodiment, the virtual resource specific discovery agents are instantiated and deployed in the first computing environment using the virtual resource specific discovery agent creation data. In one embodiment, each of the virtual resource specific discovery agents collects data from the specific resource, or resource type, assigned to the virtual resource specific discovery agents. In one embodiment, each of the virtual resource specific discovery agents then provides the data collected from the specific resource, or resource type, assigned to the virtual resource specific discovery agents to a computing environment modeling system.

In one embodiment, the computing environment modeling system then transforms the data collected by virtual resource specific discovery agents into description data for the computing environment indicating a state of the first computing environment at a given time.

Figure 3:
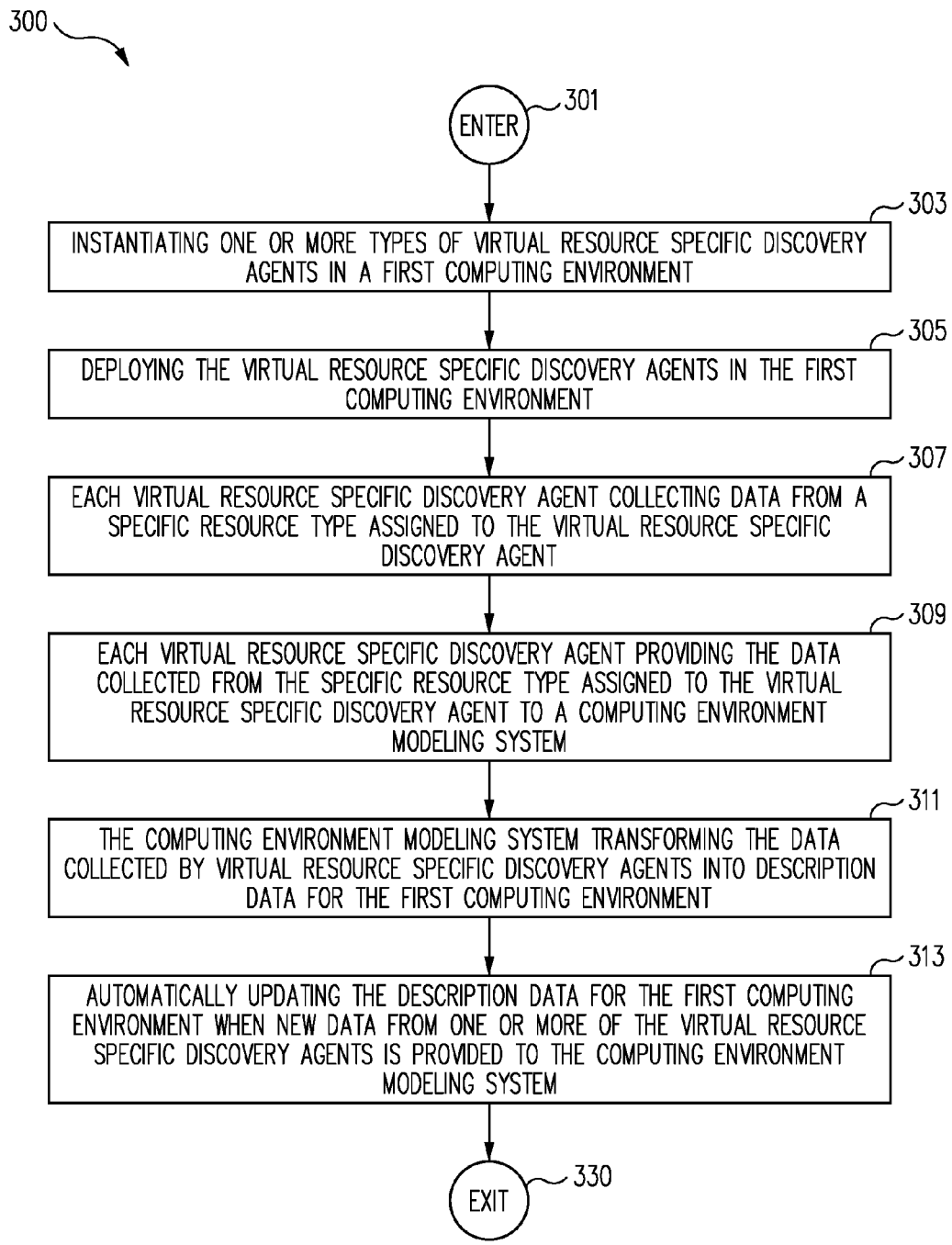
FIG. 3 is a flow chart depicting a process for creating and dynamically deploying virtual resource specific discovery agents for determining the state of a computing environment in accordance with one embodiment.

FIG. 3 is a flow chart of a process 300 for creating and dynamically deploying virtual resource specific discovery agents for determining the state of a computing environment in accordance with one embodiment. In one embodiment, process 300 for creating and dynamically deploying virtual resource specific discovery agents for determining the state of a computing environment begins at ENTER OPERATION 301 of FIG. 3 and process flow proceeds to INSTANTIATING ONE OR MORE TYPES OF VIRTUAL RESOURCE SPECIFIC DISCOVERY AGENTS IN A FIRST COMPUTING ENVIRONMENT OPERATION 303.

In one embodiment, at INSTANTIATING ONE OR MORE TYPES OF VIRTUAL RESOURCE SPECIFIC DISCOVERY AGENTS IN A FIRST COMPUTING ENVIRONMENT OPERATION 303 virtual resource specific discovery agents are provided in a first computing environment.

In one embodiment, the virtual resource specific discovery agents of INSTANTIATING ONE OR MORE TYPES OF VIRTUAL RESOURCE SPECIFIC DISCOVERY AGENTS IN A FIRST COMPUTING ENVIRONMENT OPERATION 303 are virtual assets instantiated in the first computing environment. In one embodiment, the virtual resource specific discovery agents are virtual assets instantiated in a cloud computing environment.

As used herein, the term "virtual asset" includes any virtualized entity or resource, and/or a software subsystem of an actual, or "bare metal" entity. In various embodiments, virtual assets can be, but are not limited to, virtual machines, virtual servers, and instances implemented in a cloud computing environment; administrative and/or data store instances implemented, or associated with, a cloud computing environment; services related instances associated with, and or delivered through, a cloud computing environment; and/or any other virtualized assets and/or sub-systems of "hard metal" physical devices, as discussed herein, and/or as known/available in the art at the time of filing, and/or as developed/made available after the time of filing.

In one embodiment, the virtual resource specific discovery agents of INSTANTIATING ONE OR MORE TYPES OF VIRTUAL RESOURCE SPECIFIC DISCOVERY AGENTS IN A FIRST COMPUTING ENVIRONMENT OPERATION 303 are instantiated in the first computing environment using a virtual asset creation system such as a virtual asset creation template through which the creator of the virtual resource specific discovery agent can generate virtual resource specific discovery agent creation data such as, but not limited to, internal resource specific data collection logic, such as data assigning the virtual resource specific discovery agent a specific resource, or resource type, and operational logic for directing, and/or allowing, the virtual resource specific discovery agents to perform specific state and/or metric data collection functions assigned to the virtual resource specific discovery agents; and resource access logic assigning access permissions data to the virtual resource specific discovery agents necessary to perform the data collection functions assigned to the virtual resource specific discovery agents.

In one embodiment, by virtue of the customization of the virtual asset templates to instantiate the virtual resource specific discovery agents, the virtual asset templates are transformed into specialized virtual asset templates herein referred to as virtual resource specific discovery agent creation templates.

In various embodiments, the virtual resource specific discovery agent creation templates include security logic for providing security and trust in the virtual resource specific discovery agents to be instantiated at INSTANTIATING ONE OR MORE TYPES OF VIRTUAL RESOURCE SPECIFIC DISCOVERY AGENTS IN A FIRST COMPUTING ENVIRONMENT OPERATION 303 using the virtual resource specific discovery agent creation templates, and for identifying the virtual resource specific discovery agents as trusted agents generated within the first computing environment.

In one embodiment, the virtual resource specific discovery agent security logic includes one or challenges, and/or responses to challenges, that are used to authenticate the virtual resource specific discovery agent and to further identify the virtual resource specific discovery agent as a trusted agent. In one embodiment, the virtual resource specific discovery agent security logic is used by, or provided to, other entities/resources as part of the bootstrap handshake with those entities/resources at the time a virtual resource specific discovery agent is first instantiated in the first computing environment.

As discussed below, in one embodiment, the virtual resource specific discovery agent security logic is provided to a resource specific discovery agent manager that is part of a centralized computing environment modeling system in a second computing environment in order to authenticate the virtual resource specific discovery agent and identify the virtual resource specific discovery agent as a trusted virtual asset in the first computing environment. In one embodiment, the virtual resource specific discovery agent security logic is provided in addition to standard authentication procedures performed with an initial set of credentials.

As noted above, in various embodiments, through the virtual resource specific discovery agent creation templates, each of the virtual resource specific discovery agents to be instantiated using the virtual resource specific discovery agent creation templates at INSTANTIATING ONE OR MORE TYPES OF VIRTUAL RESOURCE SPECIFIC DISCOVERY AGENTS IN A FIRST COMPUTING ENVIRONMENT OPERATION 303 are provided internal resource specific data collection logic, such as data assigning the virtual resource specific discovery agent a specific resource, or resource type, and operational logic for directing, and/or allowing, the virtual resource specific discovery agents of INSTANTIATING ONE OR MORE TYPES OF VIRTUAL RESOURCE SPECIFIC DISCOVERY AGENTS IN A FIRST COMPUTING ENVIRONMENT OPERATION 303 to perform specific state and/or metrics data gathering functions assigned to the virtual resource specific discovery agents.

As also noted above, resource access logic is provided to each of the virtual resource specific discovery agents, as separate logic, and/or as part of the internal resource specific data collection logic provided to the virtual resource specific discovery agents of INSTANTIATING ONE OR MORE TYPES OF VIRTUAL RESOURCE SPECIFIC DISCOVERY AGENTS IN A FIRST COMPUTING ENVIRONMENT OPERATION 303. In various embodiments, the resource access logic provides access permissions data to the virtual resource specific discovery agents necessary to collect the assigned state and/or metrics data, from the specific resource, or resource type, assigned to the virtual resource specific discovery agents of INSTANTIATING ONE OR MORE TYPES OF VIRTUAL RESOURCE SPECIFIC DISCOVERY AGENTS IN A FIRST COMPUTING ENVIRONMENT OPERATION 303.

In various embodiments, the internal resource specific data collection logic and/or the resource access logic provided to a given virtual resource specific discovery agent of INSTANTIATING ONE OR MORE TYPES OF VIRTUAL RESOURCE SPECIFIC DISCOVERY AGENTS IN A FIRST COMPUTING ENVIRONMENT OPERATION 303 depends on the specific state and/or metrics data collection function assigned to the virtual resource specific discovery agent and the type of resource assigned to the virtual resource specific discovery agent. For example, a virtual resource specific discovery agent may be provided with internal resource specific data collection logic including instructions for gathering data from a specific type of resource, such as a specific type of virtual server instance, or a specific virtual server instance, and resource access logic including the credentials and access rights data required to access the state and/or metrics data from the specific type of virtual asset, and/or a specific virtual asset.

As discussed above, in various embodiments, different types, or classes, of virtual resource specific discovery agents are instantiated using different types of virtual resource specific discovery agent creation data and resource access logic provided through the virtual resource specific discovery agent creation templates. As also noted above, different types, or classes, of the virtual resource specific discovery agents of INSTANTIATING ONE OR MORE TYPES OF VIRTUAL RESOURCE SPECIFIC DISCOVERY AGENTS IN A FIRST COMPUTING ENVIRONMENT OPERATION 303 are directed to data collection for specific assigned resources, or types of assigned resources.

Herein, the specific resources, or specific resource types, assigned to a virtual resource specific discovery agent can include, but are not limited to, a virtual machine instance; a virtual server instance; a virtual data store instance; a database or data store; any instance in a cloud computing environment; a cloud computing environment access system; part of a mobile device; part of a remote sensor; part of a laptop computing system; part of a desktop computing system; part of a point-of-sale computing system; and part of an ATM; a server computing system; a workstation; a storage cluster; a switching system; a router; any hardware system; any communications system; any form of proxy system; a gateway system; a firewall system; a load balancing system; a bastion host; an application; an account; an external accessibility monitoring service; an enterprise; a service; or any other virtual or non-virtual asset as discussed herein, and/or as known in the art at the time of filing, and/or as becomes known after the time of filing.

In some embodiments, the virtual resource specific discovery agents of INSTANTIATING ONE OR MORE TYPES OF VIRTUAL RESOURCE SPECIFIC DISCOVERY AGENTS IN A FIRST COMPUTING ENVIRONMENT OPERATION 303 are provided with data collection interval logic. In various embodiments, the data collection interval logic indicates a time interval between automatic deployments of the virtual resource specific discovery agent at INSTANTIATING ONE OR MORE TYPES OF VIRTUAL RESOURCE SPECIFIC DISCOVERY AGENTS IN A FIRST COMPUTING ENVIRONMENT OPERATION 303. In some embodiments, the data collection interval logic is implemented in a resource specific discovery agent manager that is part of a centralized computing environment modeling system in a second computing environment.

In various embodiments, the time interval between automatic deployments of the virtual resource specific discovery agents of INSTANTIATING ONE OR MORE TYPES OF VIRTUAL RESOURCE SPECIFIC DISCOVERY AGENTS IN A FIRST COMPUTING ENVIRONMENT OPERATION 303 is determined based, at least in part, on the resource assigned to the virtual resource specific discovery agent. In various embodiments, the time interval between automatic deployments of the virtual resource specific discovery agent is shorter if the virtual resource specific discovery agent is assigned a resource with a relatively short lifespan, such as virtual machine and server instances, or of a higher value such as a large database. In various embodiments, the time interval between automatic deployments of the virtual resource specific discovery agent is longer for less valuable resources and/or resources of a more permanent nature, such as long-term/high latency storage and accounts. In various embodiments, the interval between automatic deployments of the virtual resource specific discovery agent is relatively infrequent if the resource assigned to the virtual resource specific discovery agent is a medium lived resource such as a load balancer or bastion host.

Consequently, by providing different internal resource specific data collection logic, different resource access logic, and different data collection interval logic, in one embodiment, through the virtual resource specific discovery agent creation templates, the creator of a virtual resource specific discovery agent can easily and efficiently instantiate highly specialized virtual resource specific discovery agents to collect specific types of state and/or metrics data, from specific types of resources, and at specified intervals of time, and, as discussed below, then remove, retire, or delete the virtual resource specific discovery agents from the first computing environment when the specific data collection functions assigned to the virtual resource specific discovery agents are completed. This provides for an extremely flexible, dynamic, and secure method for obtaining state and/or metrics data from a large array of different types of resources in various computing environments.

In various embodiments, by simply changing the internal resource specific data collection logic and/or resource access logic provided to a virtual resource specific discovery agent through a virtual resource specific discovery agent creation template, the creator of the virtual resource specific discovery agents can create one, or multiple copies of, multiple different types of virtual resource specific discovery agents for collecting specified state and/or metrics data from specified resources, such as any of the resources discussed herein, and/or as known in the art at the time of filing, and/or as developed/made available after the time of filing.

In some embodiments, the different types of virtual resource specific discovery agents are created in advance of an identified need for the specific state data, and/or metric data, collection task, assigned to virtual resource specific discovery agents. In these embodiments, one or more virtual resource specific discovery agents, or templates for creating the different types of virtual resource specific discovery agents, are then stored to await an identified need for the specific state and/or metric data collection function, and/or specific type of resource, assigned to the virtual resource specific discovery agents. In these embodiments, the virtual resource specific discovery agents are then instantiated and/or deployed, at INSTANTIATING ONE OR MORE TYPES OF VIRTUAL RESOURCE SPECIFIC DISCOVERY AGENTS IN A FIRST COMPUTING ENVIRONMENT OPERATION 303, in one embodiment by a resource specific discovery agent manager, when the specific type of resource assigned to the virtual resource specific discovery agent is added, and/or when data from the specific type of resource is needed, and/or in accordance with the data collection interval logic.

In other embodiments, the virtual resource specific discovery agents are instantiated at INSTANTIATING ONE OR MORE TYPES OF VIRTUAL RESOURCE SPECIFIC DISCOVERY AGENTS IN A FIRST COMPUTING ENVIRONMENT OPERATION 303 only once the specific type of resource assigned to the virtual resource specific discovery agent is added, and/or when data from the specific type of resource is needed, and/or in accordance with the data collection interval logic. In these embodiments, once the need for a specific virtual resource specific discovery agent is identified, the appropriate internal resource specific data collection logic is provided via virtual resource specific discovery agent creation data generated through a virtual resource specific discovery agent creation template. The virtual resource specific discovery agent is then instantiated at INSTANTIATING ONE OR MORE TYPES OF VIRTUAL RESOURCE SPECIFIC DISCOVERY AGENTS IN A FIRST COMPUTING ENVIRONMENT OPERATION 303, in one embodiment, through a resource specific discovery agent manager and/or in accordance with the data collection interval logic.

As noted above, in various embodiments, a resource specific discovery agent manager is used to instantiate, and/or deploy, the virtual resource specific discovery agents at INSTANTIATING ONE OR MORE TYPES OF VIRTUAL RESOURCE SPECIFIC DISCOVERY AGENTS IN A FIRST COMPUTING ENVIRONMENT OPERATION 303. In one embodiment, the resource specific discovery agent manager instantiates, and/or deploys, the virtual resource specific discovery agents at INSTANTIATING ONE OR MORE TYPES OF VIRTUAL RESOURCE SPECIFIC DISCOVERY AGENTS IN A FIRST COMPUTING ENVIRONMENT OPERATION 303 in accordance with one or more state and/or metric data collection policies, referred to herein as resource specific discovery agent deployment policies, and/or policy data.

In various embodiments, the virtual resource specific discovery agent deployment policy data is open-endedly defined such that the virtual resource specific discovery agent deployment policy can be defined by the one or more parties such as, but not limited to, the owner of a data center, the owner or provider of a cloud computing environment, the owner or a provider of a service, the owner or provider of one or more resources, and/or any other party. In this way, using the disclosed process for providing a resource specific discovery agent, the virtual resource specific discovery agent deployment policy can be tailored to the specific needs of the one or more parties, and/or one or more resources. In addition, resource specific discovery agent deployment policies can be added, modified, or deleted, as needed to meet the needs of the one or more parties.

In one embodiment, once virtual resource specific discovery agents are provided in a first computing environment at INSTANTIATING ONE OR MORE TYPES OF VIRTUAL RESOURCE SPECIFIC DISCOVERY AGENTS IN A FIRST COMPUTING ENVIRONMENT OPERATION 303 at process flow proceeds to DEPLOYING THE VIRTUAL RESOURCE SPECIFIC DISCOVERY AGENTS IN THE FIRST COMPUTING ENVIRONMENT OPERATION 305.

In one embodiment, at DEPLOYING THE VIRTUAL RESOURCE SPECIFIC DISCOVERY AGENTS IN THE FIRST COMPUTING ENVIRONMENT OPERATION 305 the one or more virtual resource specific discovery agents of INSTANTIATING ONE OR MORE TYPES OF VIRTUAL RESOURCE SPECIFIC DISCOVERY AGENTS IN A FIRST COMPUTING ENVIRONMENT OPERATION 303 are deployed in the first computing environment to obtain/collect data from the various resources specifically assigned to each type of virtual resource specific discovery agent.

In one embodiment, once the one or more virtual resource specific discovery agents of INSTANTIATING ONE OR MORE TYPES OF VIRTUAL RESOURCE SPECIFIC DISCOVERY AGENTS IN A FIRST COMPUTING ENVIRONMENT OPERATION 303 are deployed in the first computing environment to obtain/collect data from the various resources specifically assigned to each type of virtual resource specific discovery agent at DEPLOYING THE VIRTUAL RESOURCE SPECIFIC DISCOVERY AGENTS IN THE FIRST COMPUTING ENVIRONMENT OPERATION 305, process flow proceeds to EACH VIRTUAL RESOURCE SPECIFIC DISCOVERY AGENT COLLECTING DATA FROM A SPECIFIC RESOURCE TYPE ASSIGNED TO THE VIRTUAL RESOURCE SPECIFIC DISCOVERY AGENT OPERATION 307.

In one embodiment, at EACH VIRTUAL RESOURCE SPECIFIC DISCOVERY AGENT COLLECTING DATA FROM A SPECIFIC RESOURCE TYPE ASSIGNED TO THE VIRTUAL RESOURCE SPECIFIC DISCOVERY AGENT OPERATION 307 the virtual resource specific discovery agents of DEPLOYING THE VIRTUAL RESOURCE SPECIFIC DISCOVERY AGENTS IN THE FIRST COMPUTING ENVIRONMENT OPERATION 305 collect state and/or metrics data in accordance with the internal resource specific data collection logic provided to the virtual resource specific discovery agents through the virtual resource specific discovery agent creation templates.

In one embodiment, at EACH VIRTUAL RESOURCE SPECIFIC DISCOVERY AGENT COLLECTING DATA FROM A SPECIFIC RESOURCE TYPE ASSIGNED TO THE VIRTUAL RESOURCE SPECIFIC DISCOVERY AGENT OPERATION 307 the virtual resource specific discovery agents are directed to the specific resources, or resource types, assigned to the virtual resource specific discovery agents and then, using the provided resource access logic, the virtual resource specific discovery agents obtain access to the specific resources, or resource types, assigned to the virtual resource specific agents.

In one embodiment, once access is obtained, the virtual resource specific discovery agents collect state and/or metrics data at EACH VIRTUAL RESOURCE SPECIFIC DISCOVERY AGENT COLLECTING DATA FROM A SPECIFIC RESOURCE TYPE ASSIGNED TO THE VIRTUAL RESOURCE SPECIFIC DISCOVERY AGENT OPERATION 307 in accordance with the internal resource specific data collection logic provided to the virtual resource specific discovery agents through the virtual resource specific discovery agent creation templates.

In various embodiments, the data collected by the virtual resource specific discovery agents at EACH VIRTUAL RESOURCE SPECIFIC DISCOVERY AGENT COLLECTING DATA FROM A SPECIFIC RESOURCE TYPE ASSIGNED TO THE VIRTUAL RESOURCE SPECIFIC DISCOVERY AGENT OPERATION 307 includes, but is not limited to, state data associated with the specifically assigned resource for the virtual resource specific discovery agents and/or various metrics data associated with the specifically assigned resource.

As one specific illustrative example, the data collected by a given virtual resource specific discovery agent pertains to the accounts in the first computing environment, and the characteristics of the customer that holds that account. These characteristics may come from a diversity of resources, including the enterprise user system, the enterprise accounting system where the budgets that pertain to the customer can be obtained, and the enterprise authorization system that determines which resources in the cloud this customer may obtain.

As another specific illustrative example, the data collected by a given virtual resource specific discovery agent pertains to access controls and authorization data from the first computing environment and this data is then stored in the representation of the user.

As another specific illustrative example, the compute, network, and storage aspects of the provider of the first computing environment for the different accounts is collected and this data is stored in a repository that describes the customers, their accounts, and the resources for, or associated with, the accounts.

In various embodiments, any type of data and/or metrics can be collected by a given virtual resource specific discovery agent at EACH VIRTUAL RESOURCE SPECIFIC DISCOVERY AGENT COLLECTING DATA FROM A SPECIFIC RESOURCE TYPE ASSIGNED TO THE VIRTUAL RESOURCE SPECIFIC DISCOVERY AGENT OPERATION 307 depending on the internal resource specific data collection logic provided to that given virtual resource specific discovery agent.

In one embodiment, once the virtual resource specific discovery agents of DEPLOYING THE VIRTUAL RESOURCE SPECIFIC DISCOVERY AGENTS IN THE FIRST COMPUTING ENVIRONMENT OPERATION 305 collect state and/or metrics data in accordance with the internal resource specific data collection logic provided to the virtual resource specific discovery agents through the virtual resource specific discovery agent creation templates at EACH VIRTUAL RESOURCE SPECIFIC DISCOVERY AGENT COLLECTING DATA FROM A SPECIFIC RESOURCE TYPE ASSIGNED TO THE VIRTUAL RESOURCE SPECIFIC DISCOVERY AGENT OPERATION 307, process flow proceeds to EACH VIRTUAL RESOURCE SPECIFIC DISCOVERY AGENT PROVIDING THE DATA COLLECTED FROM THE SPECIFIC RESOURCE TYPE ASSIGNED TO THE VIRTUAL RESOURCE SPECIFIC DISCOVERY AGENT TO A COMPUTING ENVIRONMENT MODELING SYSTEM OPERATION 309.

In one embodiment, once the virtual resource specific discovery agents have collected the assigned data from the specific resources, or resource types, assigned to the virtual resource specific discovery agents, the collected data is provided to a computing environment modeling system at EACH VIRTUAL RESOURCE SPECIFIC DISCOVERY AGENT PROVIDING THE DATA COLLECTED FROM THE SPECIFIC RESOURCE TYPE ASSIGNED TO THE VIRTUAL RESOURCE SPECIFIC DISCOVERY AGENT TO A COMPUTING ENVIRONMENT MODELING SYSTEM OPERATION 309.

In one embodiment, the computing environment modeling system is implemented in a second computing environment.

In one embodiment, once the virtual resource specific discovery agents have collected the assigned data from the specific resources, or resource types, assigned to the virtual resource specific discovery agents, and the collected data is provided to a computing environment modeling system at EACH VIRTUAL RESOURCE SPECIFIC DISCOVERY AGENT PROVIDING THE DATA COLLECTED FROM THE SPECIFIC RESOURCE TYPE ASSIGNED TO THE VIRTUAL RESOURCE SPECIFIC DISCOVERY AGENT TO A COMPUTING ENVIRONMENT MODELING SYSTEM OPERATION 309, process flow proceeds to THE COMPUTING ENVIRONMENT MODELING SYSTEM TRANSFORMING THE DATA COLLECTED BY VIRTUAL RESOURCE SPECIFIC DISCOVERY AGENTS INTO DESCRIPTION DATA FOR THE FIRST COMPUTING ENVIRONMENT OPERATION 311.

In one embodiment, the computing environment modeling system of EACH VIRTUAL RESOURCE SPECIFIC DISCOVERY AGENT PROVIDING THE DATA COLLECTED FROM THE SPECIFIC RESOURCE TYPE ASSIGNED TO THE VIRTUAL RESOURCE SPECIFIC DISCOVERY AGENT TO A COMPUTING ENVIRONMENT MODELING SYSTEM OPERATION 309 includes a computing environment description data generation module which transforms the data collected by the virtual resource specific discovery agents into computing environment description data at THE COMPUTING ENVIRONMENT MODELING SYSTEM TRANSFORMING THE DATA COLLECTED BY VIRTUAL RESOURCE SPECIFIC DISCOVERY AGENTS INTO DESCRIPTION DATA FOR THE FIRST COMPUTING ENVIRONMENT OPERATION 311.

In one embodiment, the computing environment description data of THE COMPUTING ENVIRONMENT MODELING SYSTEM TRANSFORMING THE DATA COLLECTED BY VIRTUAL RESOURCE SPECIFIC DISCOVERY AGENTS INTO DESCRIPTION DATA FOR THE FIRST COMPUTING ENVIRONMENT OPERATION 311 indicates a state of the first computing environment at a given time, and/or a representation of specific metrics associated with the first computing environment at a given time.

In one embodiment, once the data collected by the virtual resource specific discovery agents is transformed into computing environment description data at THE COMPUTING ENVIRONMENT MODELING SYSTEM TRANSFORMING THE DATA COLLECTED BY VIRTUAL RESOURCE SPECIFIC DISCOVERY AGENTS INTO DESCRIPTION DATA FOR THE FIRST COMPUTING ENVIRONMENT OPERATION 311, process flow proceeds to AUTOMATICALLY UPDATING THE DESCRIPTION DATA FOR THE FIRST COMPUTING ENVIRONMENT WHEN NEW DATA FROM ONE OR MORE OF THE VIRTUAL RESOURCE SPECIFIC DISCOVERY AGENTS IS PROVIDED TO THE COMPUTING ENVIRONMENT MODELING SYSTEM OPERATION 313.

In one embodiment, at AUTOMATICALLY UPDATING THE DESCRIPTION DATA FOR THE FIRST COMPUTING ENVIRONMENT WHEN NEW DATA FROM ONE OR MORE OF THE VIRTUAL RESOURCE SPECIFIC DISCOVERY AGENTS IS PROVIDED TO THE COMPUTING ENVIRONMENT MODELING SYSTEM OPERATION 313 the computing environment description data is updated whenever new data is received from one or more virtual resource specific discovery agents of DEPLOYING THE VIRTUAL RESOURCE SPECIFIC DISCOVERY AGENTS IN THE FIRST COMPUTING ENVIRONMENT OPERATION 305, in one embodiment, automatically.

In some embodiments, once a determination is made that a given virtual resource specific discovery agent has performed the specific state and/or metric data collection function assigned to that given virtual resource specific discovery agent, the given virtual resource specific discovery agent is recalled and stored for reuse on a periodic basis, and/or when the need for the specific function assigned to the given virtual resource specific discovery agent is identified. In other embodiments, once a determination is made that a given virtual resource specific discovery agent has performed the specific state and/or metric data collection function assigned to that given virtual resource specific discovery agent, the given virtual resource specific discovery agent is destroyed or deleted.

In one embodiment, once the computing environment description data is being updated whenever new data is received from one or more virtual resource specific discovery agents at AUTOMATICALLY UPDATING THE DESCRIPTION DATA FOR THE FIRST COMPUTING ENVIRONMENT WHEN NEW DATA FROM ONE OR MORE OF THE VIRTUAL RESOURCE SPECIFIC DISCOVERY AGENTS IS PROVIDED TO THE COMPUTING ENVIRONMENT MODELING SYSTEM OPERATION 313, process flow proceeds to EXIT OPERATION 330.

In one embodiment, at EXIT OPERATION 330 process 300 for creating and dynamically deploying virtual resource specific discovery agents for determining the state of a computing environment is exited to await new data.

Using process 300 for creating and dynamically deploying virtual resource specific discovery agents for determining the state of a computing environment discussed above, different types, or classes, of virtual resource specific discovery agents are instantiated using different types of virtual resource specific discovery agent creation data provided through the virtual resource specific discovery agent creation templates. Consequently, by providing different internal resource specific data collection logic through the virtual resource specific discovery agent creation templates, the creator of a virtual resource specific discovery agent can easily and efficiently instantiate highly specialized virtual resource specific discovery agents to perform specific data collection functions from specific resources, or resource types. This provides for an extremely flexible, dynamic, and secure method for collecting and updating data describing the state of a computing environment without investing resources in relatively permanent systems as is currently the norm.

Consequently, using process 300 for creating and dynamically deploying virtual resource specific discovery agents for determining the state of a computing environment, currently available cloud computing infrastructure is leveraged to provide a flexible and dynamic ability to obtain state and/or metrics data from multiple types of resources in a computing environment, such as a cloud computing environment, and then generate a relatively accurate description of the computing environment at a given time.

In one embodiment, in addition to virtual resource specific discovery agents, non-virtual resource specific discovery agents are generated and deployed to obtain data regarding various assigned resources.

In accordance with one embodiment, a method and system for creating and dynamically deploying virtual and non-virtual resource specific discovery agents for determining the state of a computing environment includes generating one or more types of virtual resource specific discovery agent creation data through a virtual asset creation system. In one embodiment, each of the one or more types of virtual resource specific discovery agent creation data is used for instantiating one of one or more types of virtual resource specific discovery agents in a first computing environment. In one embodiment, the virtual resource specific discovery agent creation data for each type of virtual resource specific discovery agent includes security logic for providing authentication and trust for the virtual resource specific discovery agent and internal resource specific data collection logic for directing and allowing the virtual resource specific discovery agent to collect data from a specific resource, or resource type, assigned to the virtual resource specific discovery agent. In one embodiment, each type of virtual resource specific discovery agent is assigned a different specific resource, or resource type.

In one embodiment, one or more types of non-virtual resource specific discovery agents are generated. In one embodiment, each of the one or more types of non-virtual resource specific discovery agents include internal resource specific data collection logic for directing and allowing each non-virtual resource specific discovery agent to collect data from a specific resource, or resource type, assigned to the non-virtual resource specific discovery agent.

In one embodiment, the virtual resource specific discovery agents are instantiated and deployed in the first computing environment using the virtual resource specific discovery agent creation data.

In one embodiment, the non-virtual resource specific discovery agents are deployed in one or more computing environments.

In one embodiment, each of the virtual resource specific discovery agents collects data from the specific resource, or resource type, assigned to the virtual resource specific discovery agents and then each of the virtual resource specific discovery agents provides the data collected from the specific resource, or resource type, assigned to the virtual resource specific discovery agents to a computing environment modeling system.

In one embodiment, each of the non-virtual resource specific discovery agents collects data from the specific resource, or resource type, assigned to the non-virtual resource specific discovery agents and then each of the non-virtual resource specific discovery agents provides the data collected from the specific resource, or resource type, assigned to the non-virtual resource specific discovery agents to the computing environment modeling system.

In one embodiment, the computing environment modeling system then transforms the data collected by virtual resource specific discovery agents and the non-virtual resource specific discovery agents into description data for the computing environment indicating a state of the first computing environment at a given time.

Figure 4:
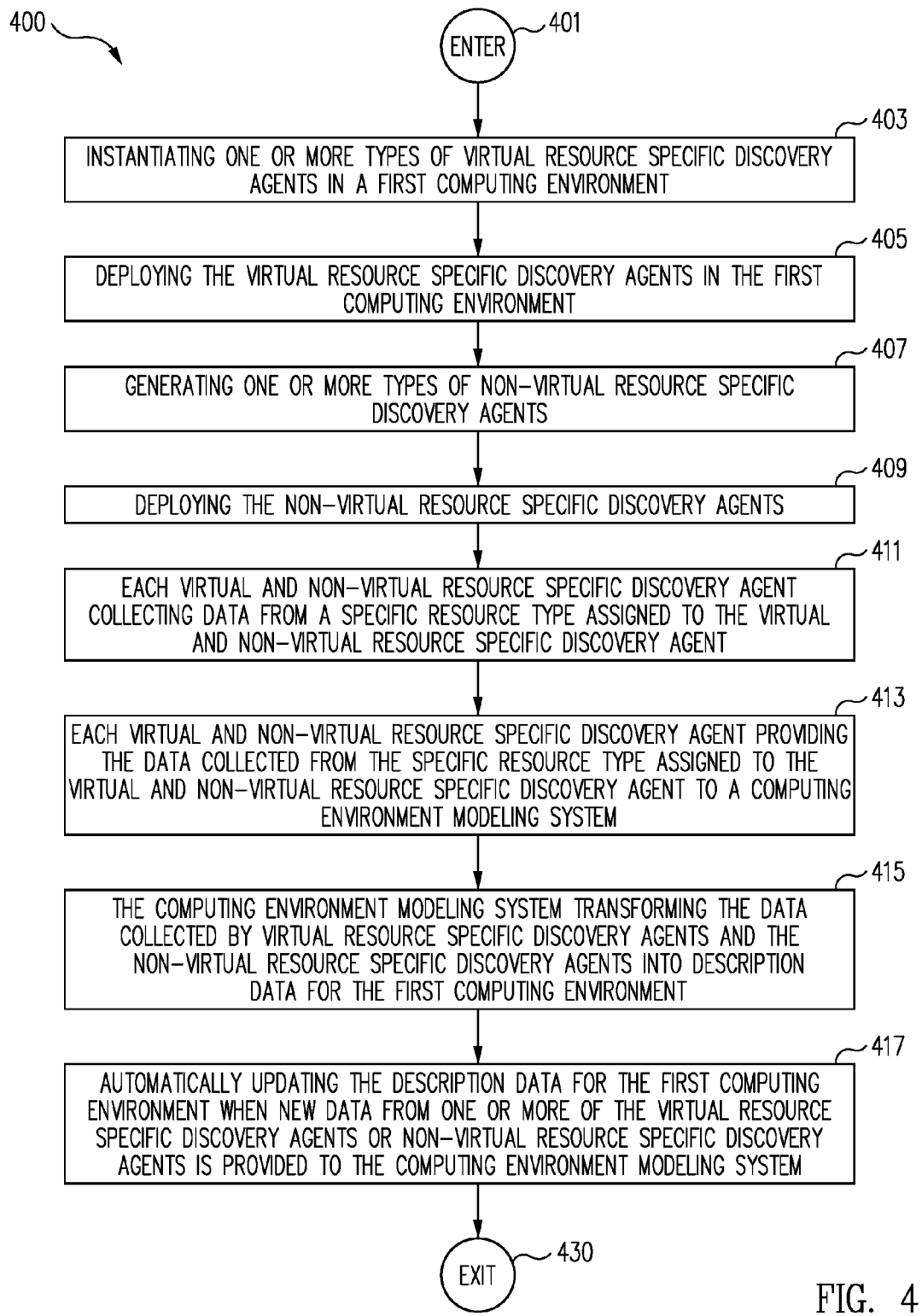
FIG. 4 is a flow chart depicting a process for creating and dynamically deploying virtual and non-virtual resource specific discovery agents for determining the state of a computing environment in accordance with one embodiment.

FIG. 4 is a flow chart of a process 400 for creating and dynamically deploying virtual and non-virtual resource specific discovery agents for determining the state of a computing environment in accordance with one embodiment. In one embodiment, process 400 for creating and dynamically deploying virtual and non-virtual resource specific discovery agents for determining the state of a computing environment begins at ENTER OPERATION 401 of FIG. 4 and process flow proceeds to INSTANTIATING ONE OR MORE TYPES OF VIRTUAL RESOURCE SPECIFIC DISCOVERY AGENTS IN A FIRST COMPUTING ENVIRONMENT OPERATION 403

In one embodiment, at INSTANTIATING ONE OR MORE TYPES OF VIRTUAL RESOURCE SPECIFIC DISCOVERY AGENTS IN A FIRST COMPUTING ENVIRONMENT OPERATION 403 virtual resource specific discovery agents are provided in a first computing environment as discussed above with respect to INSTANTIATING ONE OR MORE TYPES OF VIRTUAL RESOURCE SPECIFIC DISCOVERY AGENTS IN A FIRST COMPUTING ENVIRONMENT OPERATION 303.

In one embodiment, once virtual resource specific discovery agents are provided in a first computing environment at INSTANTIATING ONE OR MORE TYPES OF VIRTUAL RESOURCE SPECIFIC DISCOVERY AGENTS IN A FIRST COMPUTING ENVIRONMENT OPERATION 403 process flow proceeds to DEPLOYING THE VIRTUAL RESOURCE SPECIFIC DISCOVERY AGENTS IN THE FIRST COMPUTING ENVIRONMENT OPERATION 405.

In one embodiment, at DEPLOYING THE VIRTUAL RESOURCE SPECIFIC DISCOVERY AGENTS IN THE FIRST COMPUTING ENVIRONMENT OPERATION 405 the virtual resource specific discovery agents of INSTANTIATING ONE OR MORE TYPES OF VIRTUAL RESOURCE SPECIFIC DISCOVERY AGENTS IN A FIRST COMPUTING ENVIRONMENT OPERATION 403 instantiated in the first computing environment are deployed as discussed above with respect to DEPLOYING THE VIRTUAL RESOURCE SPECIFIC DISCOVERY AGENTS IN THE FIRST COMPUTING ENVIRONMENT OPERATION 305.

In one embodiment, once the one or more virtual resource specific discovery agents of INSTANTIATING ONE OR MORE TYPES OF VIRTUAL RESOURCE SPECIFIC DISCOVERY AGENTS IN A FIRST COMPUTING ENVIRONMENT OPERATION 403 are deployed in the first computing environment to obtain/collect data from the various resources specifically assigned to each type of virtual resource specific discovery agent at DEPLOYING THE VIRTUAL RESOURCE SPECIFIC DISCOVERY AGENTS IN THE FIRST COMPUTING ENVIRONMENT OPERATION 405, process flow proceeds to GENERATING ONE OR MORE TYPES OF NON-VIRTUAL RESOURCE SPECIFIC DISCOVERY AGENTS OPERATION 407.

In one embodiment, at GENERATING ONE OR MORE TYPES OF NON-VIRTUAL RESOURCE SPECIFIC DISCOVERY AGENTS OPERATION 407 one or more non-virtual resource specific discovery agents are generated.

In various embodiments, the non-virtual resource specific discovery agents of GENERATING ONE OR MORE TYPES OF NON-VIRTUAL RESOURCE SPECIFIC DISCOVERY AGENTS OPERATION 407 include security logic for providing security and trust in the non-virtual resource specific discovery agents and for identifying the non-virtual resource specific discovery agents as trusted agents.

In one embodiment, the non-virtual resource specific discovery agents of GENERATING ONE OR MORE TYPES OF NON-VIRTUAL RESOURCE SPECIFIC DISCOVERY AGENTS OPERATION 407 are provided internal resource specific data collection logic, such as data assigning the virtual resource specific discovery agent a specific resource, or resource type, and operational logic for directing, and/or allowing, the non-virtual resource specific discovery agents to perform specific state and/or metrics data gathering functions assigned to the non-virtual resource specific discovery agents.

In addition, in one embodiment, the non-virtual resource specific discovery agents of GENERATING ONE OR MORE TYPES OF NON-VIRTUAL RESOURCE SPECIFIC DISCOVERY AGENTS OPERATION 407 are provided resource access logic as separate logic, and/or as part of the internal resource specific data collection logic. In various embodiments, the resource access logic provides access permissions data to the non-virtual resource specific discovery agents necessary to collect the assigned state and/or metrics data, from the specific resource, or resource type, assigned to the non-virtual resource specific discovery agents.

In various embodiments, the internal resource specific data collection logic and/or the resource access logic provided to a given non-virtual resource specific discovery agent at GENERATING ONE OR MORE TYPES OF NON-VIRTUAL RESOURCE SPECIFIC DISCOVERY AGENTS OPERATION 407 depends on the specific state and/or metrics data collection function assigned to the non-virtual resource specific discovery agent and the type of resource assigned to the non-virtual resource specific discovery agent.

For example, a non-virtual resource specific discovery agent may be provided with internal resource specific data collection logic including instructions for gathering data from a specific type of resource, such as an external accessibility monitoring service charged with checking, or pinging, various parts of a computing environment to determine the accessibility of the computing environment, and resource access logic including the credentials and access rights data required to access the data in the external accessibility monitoring service.

In various embodiments, different types, or classes, of non-virtual resource specific discovery agents are generated at GENERATING ONE OR MORE TYPES OF NON-VIRTUAL RESOURCE SPECIFIC DISCOVERY AGENTS OPERATION 407 using different types of resource access logic and different types, or classes, of non-virtual resource specific discovery agents are directed to data collection for specific assigned resources, or types of assigned resources.

Herein, the specific resources, or specific resource types, assigned to a non-virtual resource specific discovery agent can include, but are not limited to a database or data store; a computing environment access system; an external accessibility/operational monitoring service; a mobile device; a remote sensor; a laptop computing system; a desktop computing system; a point-of-sale computing system; an ATM; a server computing system; a workstation; a storage cluster; a switching system; a router; any hardware system; any communications system; any form of proxy system; a gateway system; a firewall system; a load balancing system; a bastion host; an application; an account; an enterprise; a service; or any other asset as discussed herein, and/or as known in the art at the time of filing, and/or as becomes known after the time of filing.

In some embodiments, the non-virtual resource specific discovery agents of GENERATING ONE OR MORE TYPES OF NON-VIRTUAL RESOURCE SPECIFIC DISCOVERY AGENTS OPERATION 407 are provided with data collection interval logic. In various embodiments, the data collection interval logic indicates a time interval between automatic deployments of the non-virtual resource specific discovery agent. In some embodiments, the data collection interval logic is implemented in a resource specific discovery agent manager that is part of a centralized computing environment modeling system in a second computing environment.

In various embodiments, the time interval between automatic deployments of the non-virtual resource specific discovery agent is determined based, at least in part, on the resource assigned to the non-virtual resource specific discovery agent. In various embodiments, the time interval between automatic deployments of the non-virtual resource specific discovery agent is shorter if the non-virtual resource specific discovery agent is assigned a resource with a relatively short lifespan or of a higher value such as a large database. In various embodiments, the time interval between automatic deployments of the non-virtual resource specific discovery agent is longer for less valuable resources and/or resources of a more permanent nature, such as long-term/high latency storage and accounts. In various embodiments, the interval between automatic deployments of the non-virtual resource specific discovery agent is relatively infrequent if the resource assigned to the non-virtual resource specific discovery agent is a medium lived resource such as a load balancer or bastion host.

Consequently, by providing different internal resource specific data collection logic, different resource access logic, and different data collection interval logic, the creator of a non-virtual resource specific discovery agent can easily and efficiently generate highly specialized non-virtual resource specific discovery agents at GENERATING ONE OR MORE TYPES OF NON-VIRTUAL RESOURCE SPECIFIC DISCOVERY AGENTS OPERATION 407 to collect specific types of state and/or metrics data, from specific types of resources, and at specified intervals of time. This provides for an extremely flexible, dynamic, and secure method for obtaining state and/or metrics data from a large array of different types of resources in various computing environments.

As noted above, in various embodiments, a resource specific discovery agent manager is used to deploy the virtual and non-virtual resource specific discovery agents at GENERATING ONE OR MORE TYPES OF NON-VIRTUAL RESOURCE SPECIFIC DISCOVERY AGENTS OPERATION 407. In one embodiment, the resource specific discovery agent manager instantiates, and/or deploys, the virtual and non-virtual resource specific discovery agents in accordance with one or more state and/or metric data collection policies, referred to herein as resource specific discovery agent deployment policies, and/or policy data.

In various embodiments, the resource specific discovery agent deployment policy data is open-endedly defined such that the resource specific discovery agent deployment policy can be defined by the one or more parties such as, but not limited to, the owner of a data center, the owner or provider of a cloud computing environment, the owner or a provider of a service, the owner or provider of one or more resources, and/or any other party. In this way, using the disclosed process for providing a resource specific discovery agent, the resource specific discovery agent deployment policy can be tailored to the specific needs of the one or more parties, and/or one or more resources. In addition, resource specific discovery agent deployment policies can be added, modified, or deleted, as needed to meet the needs of the one or more parties.

In one embodiment, once one or more non-virtual resource specific discovery agents are generated at GENERATING ONE OR MORE TYPES OF NON-VIRTUAL RESOURCE SPECIFIC DISCOVERY AGENTS OPERATION 407, process flow proceeds to DEPLOYING THE NON-VIRTUAL RESOURCE SPECIFIC DISCOVERY AGENTS OPERATION 409.

In one embodiment, once the one or more non-virtual resource specific discovery agents are deployed in one or more computing environments to obtain/collect data from the various resources specifically assigned to each type of non-virtual resource specific discovery agent at DEPLOYING THE NON-VIRTUAL RESOURCE SPECIFIC DISCOVERY AGENTS OPERATION 409, process flow proceeds to EACH VIRTUAL AND NON-VIRTUAL RESOURCE SPECIFIC DISCOVERY AGENT COLLECTING DATA FROM A SPECIFIC RESOURCE TYPE ASSIGNED TO THE VIRTUAL AND NON-VIRTUAL RESOURCE SPECIFIC DISCOVERY AGENT OPERATION 411.

In one embodiment, at EACH VIRTUAL AND NON-VIRTUAL RESOURCE SPECIFIC DISCOVERY AGENT COLLECTING DATA FROM A SPECIFIC RESOURCE TYPE ASSIGNED TO THE VIRTUAL AND NON-VIRTUAL RESOURCE SPECIFIC DISCOVERY AGENT OPERATION 411 the virtual and non-virtual resource specific discovery agents of DEPLOYING THE VIRTUAL RESOURCE SPECIFIC DISCOVERY AGENTS IN THE FIRST COMPUTING ENVIRONMENT OPERATION 405 and DEPLOYING THE NON-VIRTUAL RESOURCE SPECIFIC DISCOVERY AGENTS OPERATION 409 collect state and/or metrics data in accordance with the internal resource specific data collection logic provided to the virtual and non-virtual resource specific discovery agents.

In one embodiment, at EACH VIRTUAL AND NON-VIRTUAL RESOURCE SPECIFIC DISCOVERY AGENT COLLECTING DATA FROM A SPECIFIC RESOURCE TYPE ASSIGNED TO THE VIRTUAL AND NON-VIRTUAL RESOURCE SPECIFIC DISCOVERY AGENT OPERATION 411 the virtual and non-virtual resource specific discovery agents of DEPLOYING THE VIRTUAL RESOURCE SPECIFIC DISCOVERY AGENTS IN THE FIRST COMPUTING ENVIRONMENT OPERATION 405 and DEPLOYING THE NON-VIRTUAL RESOURCE SPECIFIC DISCOVERY AGENTS OPERATION 409 are directed to the specific resources, or resource types, assigned to the virtual and non-virtual resource specific discovery agents and then, using the provided resource access logic, the virtual and non-virtual resource specific discovery agents obtain access to the specific resources, or resource types, assigned to the virtual and non-virtual resource specific discovery agents.

In one embodiment, once access is obtained, at EACH VIRTUAL AND NON-VIRTUAL RESOURCE SPECIFIC DISCOVERY AGENT COLLECTING DATA FROM A SPECIFIC RESOURCE TYPE ASSIGNED TO THE VIRTUAL AND NON-VIRTUAL RESOURCE SPECIFIC DISCOVERY AGENT OPERATION 411 the virtual and non-virtual resource specific discovery agents collect state and/or metrics data in accordance with the internal resource specific data collection logic provided to the virtual and non-virtual resource specific discovery agents.

In various embodiments, the data collected by the virtual and non-virtual resource specific discovery agents at EACH VIRTUAL AND NON-VIRTUAL RESOURCE SPECIFIC DISCOVERY AGENT COLLECTING DATA FROM A SPECIFIC RESOURCE TYPE ASSIGNED TO THE VIRTUAL AND NON-VIRTUAL RESOURCE SPECIFIC DISCOVERY AGENT OPERATION 411 includes, but is not limited to, state data associated with the specifically assigned resource for the virtual and non-virtual resource specific discovery agents and/or various metrics data associated with the specifically assigned resource.

In various embodiments, any type of data and/or metrics can be collected by a given virtual and/or non-virtual resource specific discovery agent at EACH VIRTUAL AND NON-VIRTUAL RESOURCE SPECIFIC DISCOVERY AGENT COLLECTING DATA FROM A SPECIFIC RESOURCE TYPE ASSIGNED TO THE VIRTUAL AND NON-VIRTUAL RESOURCE SPECIFIC DISCOVERY AGENT OPERATION 411 depending on the internal resource specific data collection logic provided to that given virtual and/or non-virtual resource specific discovery agent.

In one embodiment, once the virtual and non-virtual resource specific discovery agents of DEPLOYING THE VIRTUAL RESOURCE SPECIFIC DISCOVERY AGENTS IN THE FIRST COMPUTING ENVIRONMENT OPERATION 405 and DEPLOYING THE NON-VIRTUAL RESOURCE SPECIFIC DISCOVERY AGENTS OPERATION 409 collect state and/or metrics data in accordance with the internal resource specific data collection logic provided to the virtual and non-virtual resource specific discovery agents at EACH VIRTUAL AND NON-VIRTUAL RESOURCE SPECIFIC DISCOVERY AGENT COLLECTING DATA FROM A SPECIFIC RESOURCE TYPE ASSIGNED TO THE VIRTUAL AND NON-VIRTUAL RESOURCE SPECIFIC DISCOVERY AGENT OPERATION 411, process flow proceeds to EACH VIRTUAL AND NON-VIRTUAL RESOURCE SPECIFIC DISCOVERY AGENT PROVIDING THE DATA COLLECTED FROM THE SPECIFIC RESOURCE TYPE ASSIGNED TO THE VIRTUAL AND NON-VIRTUAL RESOURCE SPECIFIC DISCOVERY AGENT TO A COMPUTING ENVIRONMENT MODELING SYSTEM OPERATION 413.

In one embodiment, once the virtual and non-virtual resource specific discovery agents have collected the assigned data from the specific resources, or resource types, assigned to the virtual and non-virtual resource specific discovery agents, the collected data is then provided to a computing environment modeling system at EACH VIRTUAL AND NON-VIRTUAL RESOURCE SPECIFIC DISCOVERY AGENT PROVIDING THE DATA COLLECTED FROM THE SPECIFIC RESOURCE TYPE ASSIGNED TO THE VIRTUAL AND NON-VIRTUAL RESOURCE SPECIFIC DISCOVERY AGENT TO A COMPUTING ENVIRONMENT MODELING SYSTEM OPERATION 413.

In one embodiment, the computing environment modeling system is implemented in a second computing environment.

In one embodiment, once the collected data is provided to a computing environment modeling system at EACH VIRTUAL AND NON-VIRTUAL RESOURCE SPECIFIC DISCOVERY AGENT PROVIDING THE DATA COLLECTED FROM THE SPECIFIC RESOURCE TYPE ASSIGNED TO THE VIRTUAL AND NON-VIRTUAL RESOURCE SPECIFIC DISCOVERY AGENT TO A COMPUTING ENVIRONMENT MODELING SYSTEM OPERATION 413, process flow proceeds to THE COMPUTING ENVIRONMENT MODELING SYSTEM TRANSFORMING THE DATA COLLECTED BY VIRTUAL RESOURCE SPECIFIC DISCOVERY AGENTS AND THE NON-VIRTUAL RESOURCE SPECIFIC DISCOVERY AGENTS INTO DESCRIPTION DATA FOR THE FIRST COMPUTING ENVIRONMENT OPERATION 415.

In one embodiment, at THE COMPUTING ENVIRONMENT MODELING SYSTEM TRANSFORMING THE DATA COLLECTED BY VIRTUAL RESOURCE SPECIFIC DISCOVERY AGENTS AND THE NON-VIRTUAL RESOURCE SPECIFIC DISCOVERY AGENTS INTO DESCRIPTION DATA FOR THE FIRST COMPUTING ENVIRONMENT OPERATION 415 the data collected by the virtual and non-virtual resource specific discovery agents is transformed into computing environment description data.

In one embodiment, the computing environment modeling system of EACH VIRTUAL AND NON-VIRTUAL RESOURCE SPECIFIC DISCOVERY AGENT PROVIDING THE DATA COLLECTED FROM THE SPECIFIC RESOURCE TYPE ASSIGNED TO THE VIRTUAL AND NON-VIRTUAL RESOURCE SPECIFIC DISCOVERY AGENT TO A COMPUTING ENVIRONMENT MODELING SYSTEM OPERATION 413 includes a computing environment description data generation module.

In one embodiment, at THE COMPUTING ENVIRONMENT MODELING SYSTEM TRANSFORMING THE DATA COLLECTED BY VIRTUAL RESOURCE SPECIFIC DISCOVERY AGENTS AND THE NON-VIRTUAL RESOURCE SPECIFIC DISCOVERY AGENTS INTO DESCRIPTION DATA FOR THE FIRST COMPUTING ENVIRONMENT OPERATION 415 the computing environment description data generation module transforms the data collected by the virtual and non-virtual resource specific discovery agents into computing environment description data.

In one embodiment, the computing environment description data of THE COMPUTING ENVIRONMENT MODELING SYSTEM TRANSFORMING THE DATA COLLECTED BY VIRTUAL RESOURCE SPECIFIC DISCOVERY AGENTS AND THE NON-VIRTUAL RESOURCE SPECIFIC DISCOVERY AGENTS INTO DESCRIPTION DATA FOR THE FIRST COMPUTING ENVIRONMENT OPERATION 415 indicates a state of the first computing environment at a given time, and/or a representation of specific metrics associated with the first computing environment at a given time.

In one embodiment, once the data collected by the virtual and non-virtual resource specific discovery agents is transformed into computing environment description data at THE COMPUTING ENVIRONMENT MODELING SYSTEM TRANSFORMING THE DATA COLLECTED BY VIRTUAL RESOURCE SPECIFIC DISCOVERY AGENTS AND THE NON-VIRTUAL RESOURCE SPECIFIC DISCOVERY AGENTS INTO DESCRIPTION DATA FOR THE FIRST COMPUTING ENVIRONMENT OPERATION 415, process flow proceeds to AUTOMATICALLY UPDATING THE DESCRIPTION DATA FOR THE FIRST COMPUTING ENVIRONMENT WHEN NEW DATA FROM ONE OR MORE OF THE VIRTUAL RESOURCE SPECIFIC DISCOVERY AGENTS OR NON-VIRTUAL RESOURCE SPECIFIC DISCOVERY AGENTS IS PROVIDED TO THE COMPUTING ENVIRONMENT MODELING SYSTEM OPERATION 417.

In one embodiment, at AUTOMATICALLY UPDATING THE DESCRIPTION DATA FOR THE FIRST COMPUTING ENVIRONMENT WHEN NEW DATA FROM ONE OR MORE OF THE VIRTUAL RESOURCE SPECIFIC DISCOVERY AGENTS OR NON-VIRTUAL RESOURCE SPECIFIC DISCOVERY AGENTS IS PROVIDED TO THE COMPUTING ENVIRONMENT MODELING SYSTEM OPERATION 417 the computing environment description data of THE COMPUTING ENVIRONMENT MODELING SYSTEM TRANSFORMING THE DATA COLLECTED BY VIRTUAL RESOURCE SPECIFIC DISCOVERY AGENTS AND THE NON-VIRTUAL RESOURCE SPECIFIC DISCOVERY AGENTS INTO DESCRIPTION DATA FOR THE FIRST COMPUTING ENVIRONMENT OPERATION 415 is updated whenever new data of is received from one or more virtual and non-virtual resource specific discovery agents, in one embodiment, automatically.

In one embodiment, once the computing environment description data of THE COMPUTING ENVIRONMENT MODELING SYSTEM TRANSFORMING THE DATA COLLECTED BY VIRTUAL RESOURCE SPECIFIC DISCOVERY AGENTS AND THE NON-VIRTUAL RESOURCE SPECIFIC DISCOVERY AGENTS INTO DESCRIPTION DATA FOR THE FIRST COMPUTING ENVIRONMENT OPERATION 415 is being updated whenever new data of is received from one or more virtual and non-virtual resource specific discovery agents at AUTOMATICALLY UPDATING THE DESCRIPTION DATA FOR THE FIRST COMPUTING ENVIRONMENT WHEN NEW DATA FROM ONE OR MORE OF THE VIRTUAL RESOURCE SPECIFIC DISCOVERY AGENTS OR NON-VIRTUAL RESOURCE SPECIFIC DISCOVERY AGENTS IS PROVIDED TO THE COMPUTING ENVIRONMENT MODELING SYSTEM OPERATION 417, process flow proceeds to EXIT OPERATION 430.

In one embodiment, at EXIT OPERATION 430 process 400 for creating and dynamically deploying virtual and non-virtual resource specific discovery agents for determining the state of a computing environment is exited to await new data.

Using process 400 for creating and dynamically deploying virtual and non-virtual resource specific discovery agents for determining the state of a computing environment discussed above currently available cloud computing infrastructure is leveraged to provide a flexible and dynamic ability to obtain state and/or metrics data from multiple types of resources in a computing environment, such as a cloud computing environment, and then generate a relatively accurate description of the computing environment at a given time.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for creating and dynamically deploying virtual resource specific discovery agents for determining the state of a computing environment comprising:
   at least one processor; and
   at least one memory coupled to the at least one processor, the at least one memory having stored therein instructions which when executed by any set of the one or more processors, perform a process for creating and dynamically deploying virtual resource specific discovery agents for determining the state of a computing environment, the process for creating and dynamically deploying virtual resource specific discovery agents for determining the state of a computing environment including:
generating virtual resource specific discovery agent creation data through a virtual asset creation system, the virtual resource specific discovery agent creation data for instantiating a virtual resource specific discovery agent in a computing environment, the virtual resource specific discovery agent creation data including:
security logic for providing authentication and trust for the virtual resource specific discovery agent; and
internal resource specific data collection logic for directing and allowing the virtual resource specific discovery agent to collect data from a specific resource, or resource type, assigned to the virtual resource specific discovery agent;
instantiating and deploying the virtual resource specific discovery agent in the computing environment using the virtual resource specific discovery agent creation data;
the virtual resource specific discovery agent collecting data from a specific resource, or resource type, assigned to the virtual resource specific discovery agent; and
the virtual resource specific discovery agent providing the data collected from the specific resource, or resource type, assigned to the virtual resource specific discovery agent to a computing environment modeling system.

2. The system for creating and dynamically deploying virtual resource specific discovery agents for determining the state of a computing environment of claim 1 wherein the virtual asset creation system is a virtual asset creation template.

3. The system for creating and dynamically deploying virtual resource specific discovery agents for determining the state of a computing environment of claim 1 wherein the virtual resource specific discovery agent is a virtual resource specific discovery agent selected from the group of the virtual resource specific discovery agents consisting of:
a virtual machine instance;
a virtual server instance;
a data store instance; and
any instance in a cloud computing environment.

4. The system for creating and dynamically deploying virtual resource specific discovery agents for determining the state of a computing environment of claim 1 wherein the specific resource, or resource type, assigned to the virtual resource specific discovery agent is selected from the group of resources consisting of:
a virtual machine instance;
a virtual server instance;
a virtual data store instance;
a database or data store;
an instance in a cloud computing environment;
a cloud computing environment access system;
part of a mobile device;
part of a remote sensor;
part of a laptop computing system;
part of a desktop computing system;
part of a point-of-sale computing system; and
part of an ATM;
a server computing system;
a workstation;
a storage cluster;
a switching system;
a router;
any hardware system;
any communications system;
any form of proxy system;
a gateway system;
a firewall system;
a load balancing system;
an application; and
a service.

5. The system for creating and dynamically deploying virtual resource specific discovery agents for determining the state of a computing environment of claim 1 wherein the virtual resource specific discovery agent creation data further includes data collection interval logic directing the virtual resource specific discovery agent to collect data from the specific resource, or resource type, assigned to the virtual resource specific discovery agent on a periodic basis at defined time intervals.

6. The system for creating and dynamically deploying virtual resource specific discovery agents for determining the state of a computing environment of claim 5 wherein the time interval is defined based on the specific resource, or resource type, assigned to the virtual resource specific discovery agent.

7. The system for creating and dynamically deploying virtual resource specific discovery agents for determining the state of a computing environment of claim 1 wherein once the virtual resource specific discovery agent provides the data collected from the specific resource, or resource type, assigned to the virtual resource specific discovery agent to the computing environment modeling system, the virtual resource specific discovery agent is retired.

8. The system for creating and dynamically deploying virtual resource specific discovery agents for determining the state of a computing environment of claim 7 wherein retiring the virtual resource specific discovery agent includes recalling the virtual resource specific discovery agent from the first computing environment.

9. The system for creating and dynamically deploying virtual resource specific discovery agents for determining the state of a computing environment of claim 7 wherein retiring the virtual resource specific discovery agent includes deleting the virtual resource specific discovery agent.

10. A system for creating and dynamically deploying virtual resource specific discovery agents for determining the state of a computing environment comprising:
at least one processor; and
at least one memory coupled to the at least one processor, the at least one memory having stored therein instructions which when executed by any set of the one or more processors, perform a process for creating and dynamically deploying virtual resource specific discovery agents for determining the state of a computing environment, the process for creating and dynamically deploying virtual resource specific discovery agents for determining the state of a computing environment including:
generating one or more types of virtual resource specific discovery agent creation data through a virtual asset creation system, each of the one or more types of virtual resource specific discovery agent creation data for instantiating one of one or more types of virtual resource specific discovery agents in a computing environment, the virtual resource specific discovery agent creation data for each type of virtual resource specific discovery agent including:
security logic for providing authentication and trust for the virtual resource specific discovery agent; and
internal resource specific data collection logic for directing and allowing the virtual resource specific discovery agent to collect data from a specific resource, or resource type, assigned to the virtual resource specific discovery agent;

instantiating and deploying the virtual resource specific discovery agents in the computing environment using the virtual resource specific discovery agent creation data;

each of the virtual resource specific discovery agents collecting data from the specific resource, or resource type, assigned to the virtual resource specific discovery agent; and each of the virtual resource specific discovery agents providing the data collected from the specific resource, or resource type, assigned to the virtual resource specific discovery agent to a computing environment modeling system.

11. The system for creating and dynamically deploying virtual resource specific discovery agents for determining the state of a computing environment of claim 10 wherein the virtual asset creation system is a virtual asset creation template.

12. The system for creating and dynamically deploying virtual resource specific discovery agents for determining the state of a computing environment of claim 10 wherein at least one of the virtual resource specific discovery agents is a virtual resource specific discovery agent selected from the group of the virtual resource specific discovery agents consisting of:
   a virtual machine instance;
   a virtual server instance;
   a data store instance; and
   any instance in a cloud computing environment.

13. The system for creating and dynamically deploying virtual resource specific discovery agents for determining the state of a computing environment of claim 10 wherein at least one of the specific resource, or resource type, assigned to the virtual resource specific discovery agents is selected from the group of resources consisting of:
   a virtual machine instance;
   a virtual server instance;
   a virtual data store instance;
   a database or data store;
   an instance in a cloud computing environment;
   a cloud computing environment access system;
   part of a mobile device;
   part of a remote sensor;
   part of a laptop computing system;
   part of a desktop computing system;
   part of a point-of-sale computing system; and
   part of an ATM;
   a server computing system;
   a workstation;
   a storage cluster;
   a switching system;
   a router;
   any hardware system;
   any communications system;
   any form of proxy system;
   a gateway system;
   a firewall system;
   a load balancing system;
   an application; and
   a service.

14. The system for creating and dynamically deploying virtual resource specific discovery agents for determining the state of a computing environment of claim 10 wherein the one or more types of virtual resource specific discovery agent creation data used for instantiating the one or more types of virtual resource specific discovery agents in a computing environment further includes data collection interval logic directing the virtual resource specific discovery agents to collect data from the specific resource, or resource type, assigned to the virtual resource specific discovery agents on a periodic basis at defined time intervals.

15. The system for creating and dynamically deploying virtual resource specific discovery agents for determining the state of a computing environment of claim 14 wherein the time interval is defined based on the specific resource, or resource type, assigned to the virtual resource specific discovery agents.

16. The system for creating and dynamically deploying virtual resource specific discovery agents for determining the state of a computing environment of claim 10 wherein the computing environment modeling system transforms the data collected by virtual resource specific discovery agents into description data for the computing environment indicating a state of the computing environment at a given time.

17. The system for creating and dynamically deploying virtual resource specific discovery agents for determining the state of a computing environment of claim 16 wherein description data for the computing environment is automatically updated as new data from one or more of the virtual resource specific discovery agents is provided to the computing environment modeling system.

18. A system for creating and dynamically deploying virtual and non-virtual resource specific discovery agents for determining the state of a computing environment comprising:
   at least one processor; and
   at least one memory coupled to the at least one processor, the at least one memory having stored therein instructions which when executed by any set of the one or more processors, perform a process for creating and dynamically deploying virtual and non-virtual resource specific discovery agents for determining the state of a computing environment, the process for creating and dynamically deploying virtual and non-virtual resource specific discovery agents for determining the state of a computing environment including:
   generating one or more types of virtual resource specific discovery agent creation data through a virtual asset creation system, each of the one or more types of virtual resource specific discovery agent creation data for instantiating one of one or more types of virtual resource specific discovery agents in a first computing environment, the virtual resource specific discovery agent creation data for each type of virtual resource specific discovery agent including:
   security logic for providing authentication and trust for the virtual resource specific discovery agent; and
   internal resource specific data collection logic for directing and allowing the virtual resource specific discovery agent to collect data from a specific resource, or resource type, assigned to the virtual resource specific discovery agent;
   instantiating and deploying the one or more virtual resource specific discovery agents in the first computing environment using the virtual resource specific discovery agent creation data;
   generating one or more types of non-virtual resource specific discovery agents, each of the one or more types of non-virtual resource specific discovery agents including internal resource specific data collection logic for directing and allowing each non-virtual resource specific discovery agent to collect data from a specific resource, or resource type, assigned to the non-virtual resource specific discovery agent;

deploying the non-virtual resource specific discovery agents;

each of the virtual resource specific discovery agents collecting data from the specific resource, or resource type, assigned to the virtual resource specific discovery agent;

each of the non-virtual resource specific discovery agents collecting data from the specific resource, or resource type, assigned to the non-virtual resource specific discovery agent;

each of the virtual resource specific discovery agents providing the data collected from the specific resource, or resource type, assigned to the virtual resource specific discovery agent to a computing environment modeling system; and each of the non-virtual resource specific discovery agents providing the data collected from the specific resource, or resource type, assigned to the non-virtual resource specific discovery agent to the computing environment modeling system.

19. The system for creating and dynamically deploying virtual and non-virtual resource specific discovery agents for determining the state of a computing environment of claim 18 wherein at least one of the specific resource, or resource type, assigned to the virtual resource specific discovery agents and/or non-virtual resource specific discovery agents is selected from the group of resources consisting of:
a virtual machine instance;
a virtual server instance;
a virtual data store instance;
a database or data store;
an instance in a cloud computing environment;
a cloud computing environment access system;
part of a mobile device;
part of a remote sensor;
part of a laptop computing system;
part of a desktop computing system;
part of a point-of-sale computing system; and
part of an ATM;
a cloud computing environment access testing system;
a server computing system;
a workstation;
a storage cluster;
a switching system;
a router;
any hardware system;
any communications system;
any form of proxy system;
a gateway system;
a firewall system;
a load balancing system;
an application; and
a service.

20. The system for creating and dynamically deploying virtual and non-virtual resource specific discovery agents for determining the state of a computing environment of claim 18 wherein the one or more types of virtual resource specific discovery agent creation data used for instantiating the one or more types of virtual resource specific discovery agents in a first computing environment further includes data collection interval logic directing the virtual resource specific discovery agents to collect data from the specific resource, or resource type, assigned to the virtual resource specific discovery agents on a periodic basis at defined time intervals.

21. The system for creating and dynamically deploying virtual and non-virtual resource specific discovery agents for determining the state of a computing environment of claim 20 wherein the time interval is defined based on the specific resource, or resource type, assigned to the virtual resource specific discovery agents.

22. The system for creating and dynamically deploying virtual and non-virtual resource specific discovery agents for determining the state of a computing environment of claim 18 wherein the internal resource specific data collection logic for each of the non-virtual resource specific discovery agents further includes data collection interval logic directing the non-virtual resource specific discovery agents to collect data from the specific resource, or resource type, assigned to the non-virtual resource specific discovery agents on a periodic basis at defined time intervals.

23. The system for creating and dynamically deploying virtual and non-virtual resource specific discovery agents for determining the state of a computing environment of claim 22 wherein the time interval is defined based on the specific resource, or resource type, assigned to the non-virtual resource specific discovery agents.

24. The system for creating and dynamically deploying virtual and non-virtual resource specific discovery agents for determining the state of a computing environment of claim 18 wherein the computing environment modeling system transforms the data collected by virtual resource specific discovery agents and the data collected by non-virtual resource specific discovery agents from the specific resource, or resource type, assigned to the non-virtual resource specific discovery agents into description data for the computing environment indicating a state of the first computing environment at a given time.

25. The system for creating and dynamically deploying virtual and non-virtual resource specific discovery agents for determining the state of a computing environment of claim 24 wherein description data for the computing environment is automatically updated as new data from one or more of the virtual resource specific discovery agents and/or non-virtual resource specific discovery agents is provided to the computing environment modeling system.

26. The system for creating and dynamically deploying virtual and non-virtual resource specific discovery agents for determining the state of a computing environment of claim 18 wherein once a virtual resource specific discovery agent provides the data collected from the specific resource, or resource type, assigned to the virtual resource specific discovery agent to the computing environment modeling system, the virtual resource specific discovery agent is retired.

27. The system for creating and dynamically deploying virtual and non-virtual resource specific discovery agents for determining the state of a computing environment of claim 26 wherein retiring the virtual resource specific discovery agent includes recalling the virtual resource specific discovery agent from the first computing environment.

28. The system for creating and dynamically deploying virtual and non-virtual resource specific discovery agents for determining the state of a computing environment of claim 26 wherein retiring the virtual resource specific discovery agent includes deleting the virtual resource specific discovery agent.

* * * * *